(12) United States Patent
Eguchi et al.

(10) Patent No.: US 11,260,480 B2
(45) Date of Patent: Mar. 1, 2022

(54) FASTENING APPARATUS AND FASTENER PASS/FAIL DETERMINING METHOD

(71) Applicant: DAI-ICHI DENTSU LTD., Tokyo (JP)

(72) Inventors: Takeshi Eguchi, Tokyo (JP); Takayuki Kitou, Tokyo (JP); Teruhiko Hirasawa, Tokyo (JP); Hidenori Sato, Tokyo (JP)

(73) Assignee: DAI-ICHI DENTSU LTD., Chofu (JP)

( * ) Notice: Subject to any disclaimer, the term of this patent is extended or adjusted under 35 U.S.C. 154(b) by 52 days.

(21) Appl. No.: 16/616,874

(22) PCT Filed: Jun. 28, 2018

(86) PCT No.: PCT/JP2018/024593
§ 371 (c)(1),
(2) Date: Nov. 25, 2019

(87) PCT Pub. No.: WO2019/013007
PCT Pub. Date: Jan. 17, 2019

(65) Prior Publication Data
US 2021/0046593 A1 Feb. 18, 2021

(30) Foreign Application Priority Data
Jul. 10, 2017 (JP) .............................. JP2017-134652
Dec. 25, 2017 (WO) .................. PCT/JP2017/046318

(51) Int. Cl.
*B23P 19/00* (2006.01)
*B23P 19/04* (2006.01)
(Continued)

(52) U.S. Cl.
CPC ................ *B23P 19/04* (2013.01); *F16B 5/04* (2013.01); *F16B 19/06* (2013.01)

(58) Field of Classification Search
CPC .. B23P 19/04; F16B 5/04; F16B 19/06; B29C 66/742; B29C 65/7841; B29C 66/81423;
(Continued)

(56) References Cited

U.S. PATENT DOCUMENTS 5,361,483 A * 11/1994 Rainville .......... B29C 66/73921
29/524.1
2005/0125985 A1 6/2005 Adams et al.
(Continued)

FOREIGN PATENT DOCUMENTS

CN 106233002 12/2016 ................ F16B 5/04
CN 106233002 A 12/2016
(Continued)

OTHER PUBLICATIONS

English translation of Matsugishi (JP2002067159) (Year: 2002).*
(Continued)

*Primary Examiner* — Jun S Yoo
(74) *Attorney, Agent, or Firm* — J-Tek Law PLLC; Jeffrey D. Tekanic; Scott T. Wakeman

(57) ABSTRACT

A fastening apparatus includes a fastening device (1, 3) that heats in a non-contacting state, and then applies pressure to, a shaft part (11*b*) or shaft body (111) while it is inserted through the through holes (W10, W20) of workpieces (W1, W2), thereby forming at least a second head part (11*c*) of a fastener (11). The fastening device (1, 3) includes: a fastening die (15) that forms the second head part (11*c*); and a shaft-part pressure-applying device (9) that applies the pressure to the fastening die (15). A determining device (5) determines whether the fastener (11) is defective or not by calculating a load curve defined by the time and the load during which the pressure was applied and then determining whether an amount of change per unit of time in the load
(Continued)

curve after a reference load has been exceeded is within a range of a predetermined reference value.

33 Claims, 14 Drawing Sheets

(51) Int. Cl.
*F16B 5/04* (2006.01)
*F16B 19/06* (2006.01)

(58) Field of Classification Search
CPC .......... B29C 66/81431; B29C 65/3668; B29C 66/43; B29C 66/41; B29C 66/83221; B29C 66/1122; B29C 66/7392; B29C 65/601; B29C 66/92443; B29C 66/92921; B29C 65/3684; B29C 65/3616; B29C 43/18

See application file for complete search history.

(56) References Cited

U.S. PATENT DOCUMENTS

| | | |
|---|---|---|
| 2006/0200967 A1 | 9/2006 | Adams et al. |
| 2007/0033788 A1* | 2/2007 | Chitty .................... B21J 15/043 29/243.521 |
| 2007/0067986 A1* | 3/2007 | Chitty .................... B21J 15/26 29/812.5 |
| 2014/0356053 A1 | 12/2014 | Urayama |
| 2016/0341234 A1 | 11/2016 | Germann et al. |
| 2017/0066182 A1* | 3/2017 | Trudeau .............. B29C 66/8181 |
| 2019/0338797 A1 | 11/2019 | Germann et al. |
| 2021/0046680 A1 | 2/2021 | Eguchi et al. |

FOREIGN PATENT DOCUMENTS

| | | | |
|---|---|---|---|
| CN | 106414038 A | 2/2017 | |
| EP | 2097650 A2 | 9/2009 | |
| FR | 2978510 A1 | 2/2013 | |
| JP | H04244609 A | 9/1992 | |
| JP | H0592300 | 4/1993 | .............. B21J 15/28 |
| JP | H0592300 U | 12/1993 | |
| JP | 2002067159 A | 3/2002 | |
| JP | 2010099659 A | 5/2010 | |
| JP | 2017511443 | 4/2017 | |
| JP | 2017114016 A | 6/2017 | |
| WO | 2005058525 A2 | 6/2005 | |
| WO | 2009061123 A2 | 5/2009 | |
| WO | 2013094008 A1 | 6/2013 | |
| WO | 2015132766 A1 | 9/2015 | |
| WO | 2018163072 A1 | 9/2018 | |

OTHER PUBLICATIONS

Hanke H. Martin: "Bedienungsanleitung BNG-2009 / 2010 / 2013" Blindnietgeraet Ausgabedatum: Apr. 2011 Firmware: 2.0PC-Software: 2.0, operating instructions riveting device and software, p. 32, 33 , Apr. 1, 2011 (Apr. 1, 2011). XP055778165 Retrieved from the Internet: URL: http://docplayer.org/111046396-Bedienungsanleitung-bng-2009-2010-2013.html [retrieved by EPO on Feb. 22, 2021].
Office Action and Search Report from the Chinese Patent Office dated Mar. 2, 2021 in related application No. 201880036083.6, and translation thereof.
Office Action from the Chinese Patent Office dated Mar. 24, 2021 in related application No. 201880036055.4, and translation thereof.
Supplementary European Search Report and Written Opinion dated Mar. 2, 2021 in related application EP 18 83 2363, and examined claims.
Supplementary European Search Report and Written Opinion dated Mar. 4, 2021 in related application EP 18 83 1675, and examined claims.
English translation of the International Search Report dated Jan. 17, 2019 for parent application No. PCT/JP2018/024593.
English translation of the Written Opinion of the International Searching Authority for parent application No. PCT/JP2018/024593.
Unpublished U.S. Appl. No. 16/616,824.
English translation of International Preliminary Report on Patentability in parent application No. PCT/JP2018/024593 dated Nov. 29, 2019.
Translation of Search Report from the Chinese Patent Office dated Mar. 2, 2021 in related application No. 201880036083.6.

* cited by examiner

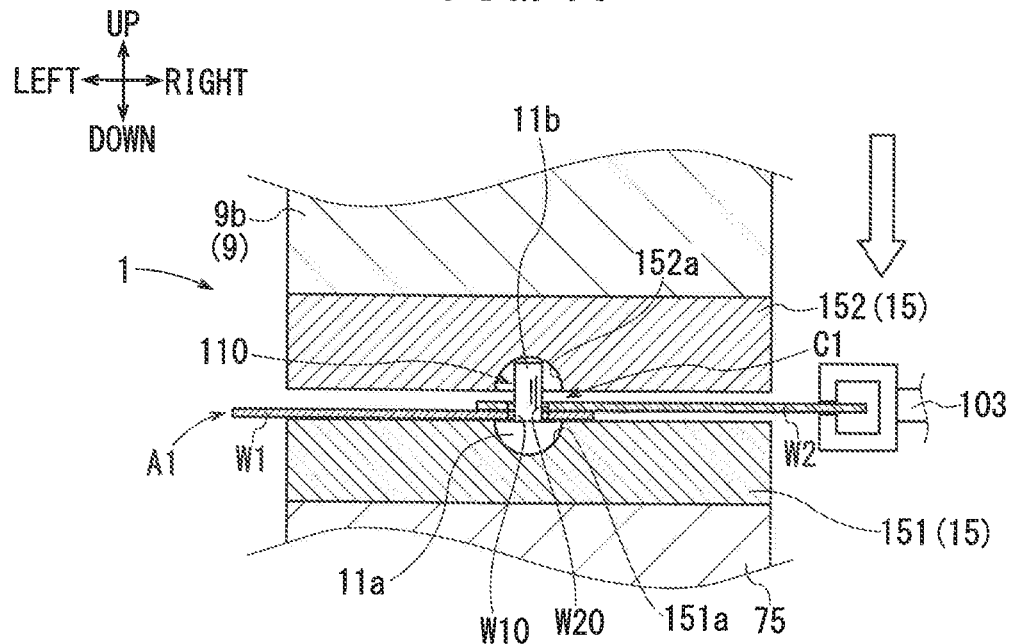
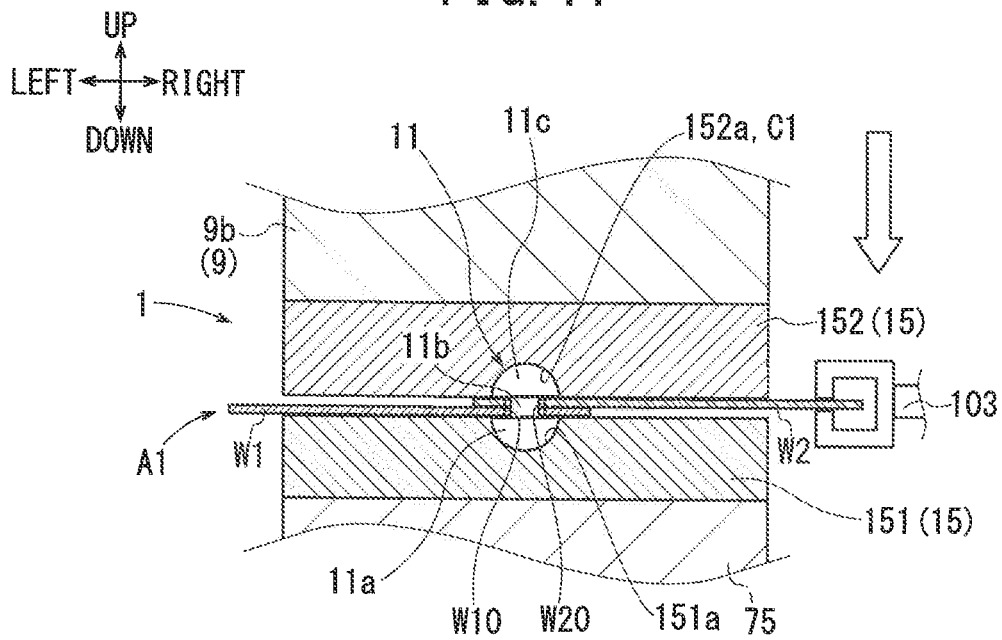

US 11,260,480 B2

FASTENING APPARATUS AND FASTENER PASS/FAIL DETERMINING METHOD

CROSS-REFERENCE

The present application is the US national stage of International application serial no. PCT/JP2018/024593 filed on Jun. 28, 2018, which claims priority to International application serial no. PCT/JP2017/046318 filed on Dec. 25, 2017 and to Japanese patent application serial number 2017-134652 filed on Jul. 10, 2017.

TECHNICAL FIELD

The present invention relates to a fastening apparatus that fastens a plurality of workpieces, through which through holes are provided, using a fastener, and to a fastener pass/fail determining method.

BACKGROUND ART

Various fastening apparatuses that fasten a plurality of workpieces, through which through holes are provided, using a fastener have been proposed in the past. In addition, in recent years, from the viewpoints of reducing the weight of the fastener, preventing corrosion and the like, fastening apparatuses that fasten a plurality of workpieces using a fastener made of a fiber-reinforced resin have also been proposed. Such a fastening apparatus is disclosed in, for example, Japanese Laid-open Patent Publication H4-244609.

This known fastening apparatus uses a shaft body that extends in an axial direction and is made of a carbon-fiber-reinforced thermoplastic resin. The shaft body is first passed through the through hole of each workpiece. Next, the shaft body and the workpieces in this state are disposed between two fastener-forming dies. Next, while both fastener-forming dies are being heated, the shaft body and the workpieces are sandwiched, while being pressed, by the two fastener-forming dies. Thereby, the shaft body is heated by both of the fastener-forming dies, changes to a plastically deformable softened state, and is plastically deformed, owing to the pressure applied by the two fastener-forming dies. As a result, a first head part is formed on one-end side of the shaft body in the axial direction, and a second head part is formed on the other-end side in the axial direction. In addition, a shaft part, which is inserted through the through hole of each workpiece, is formed between the first head part and the second head part. Thus, the shaft body is deformed/shaped into a fastener. Thereafter, by cooling the fastener, the fastener fastens the workpieces. Then, by removing the fastener and the workpieces from the fastener-forming dies, the work of fastening the plurality of workpieces using the fastener is complete.

SUMMARY OF THE INVENTION

However, in the above-mentioned known fastening apparatus, because the shaft body is heated by the heat of both heated fastener-forming dies to change the shaft body to a plastically deformable softened state, it is necessary to raise both fastener-forming dies to a high temperature. Consequently, even after the first and second head parts and the shaft part are formed in (on) the shaft body by applying pressure using both fastener-forming dies, both fastener-forming dies maintain a high heat for a long time. As a result, with this known fastening apparatus, it takes a long time until the fastener is cooled. Thereby, with this fastening apparatus, the work of fastening the plurality of workpieces using the fastener cannot be performed quickly.

In addition, when forming the fastener, a failure (defect) may occur in the heating of the shaft body and, in addition, variation inevitably exists among the solids of the shaft bodies. As a result, with this known fastening apparatus, failures (defects) in the formation of the fasteners inevitably occur. Even though there is a risk that the work of fastening the workpieces will be imperfect if performed using such a defectively formed fastener, when a defectively formed fastener, imperfect fastening work owing thereto, or the like occurs, the discovery thereof is difficult when using this fastening apparatus. Consequently, with this fastening apparatus, it is difficult to increase the quality of the work of fastening the workpieces.

The present invention was conceived considering the above-mentioned problem and it is an object of the present teachings to provide a fastening apparatus that is capable of rapidly performing the work of fastening a plurality of workpieces using a fastener made of a fiber-reinforced resin and that is capable of increasing the quality of the work of fastening the workpieces, and to provide a fastener pass/fail determining method.

A first fastening apparatus of the present teachings is a fastening apparatus that fastens a plurality of workpieces, through which through holes are provided, using a fastener, wherein:

an intermediate piece, which comprises a first head part and a shaft part formed integrally with the first head part and which extends in an axial direction, is used; comprising:

a fastening device in which, by heating in a non-contacting state and then applying pressure while the shaft part is inserted through the through holes of the workpieces, a second head part is formed on the intermediate piece integrally with the shaft part and opposing the first head part, and the intermediate piece serves as (becomes) the fastener; and a determining device that determines whether the fastener has passed or failed (i.e. is defective or not defective); wherein:

the intermediate piece is made of a fiber-reinforced thermoplastic resin;

the fastening device comprises:
 a fastener-forming die that is capable of forming the second head part from the heated shaft part; and
 a shaft-part pressure-applying device that is capable of applying pressure to the fastener-forming die; and the determining device calculates a load curve defined by the time and the load during which pressure is applied and determines whether an amount of change per unit of time in the load curve after a reference load has been exceeded is within a range of a first reference value that is set in advance.

With the first fastening apparatus of the present teachings, in order to soften the shaft part of the intermediate piece, which is made of a fiber-reinforced thermoplastic resin, by heating, the shaft part is heated in a non-contacting state while the shaft part is inserted through the through holes of the workpieces. Consequently, with this fastening apparatus, there is no need to heat the fastener-forming die in order to heat the shaft part. Thereby, compared with the intermediate piece which has the heated shaft part, the temperature of the fastener-forming die is low. Consequently, when the fastener is being formed from (by reshaping) the intermediate piece, the heat of the intermediate piece can be absorbed by the fastener-forming die. As a result, according to this fastening apparatus, the formed fastener can be cooled quickly compared with an embodiment in which the fastener is formed by heating the fastener-forming die.

In addition, with this fastening apparatus, the determining device calculates the load curve, which is defined by the time and the load during the application of pressure, and determines whether the amount of change per unit of time in the load curve after the reference load has been exceeded is within the range of the first reference value, which is set in advance. If buckling, a crack, or the like occurs in the shaft part during the formation of the fastener, then the amount of change per unit of time in the load curve after the reference load has been exceeded is outside the range of the first reference value. Thereby, it becomes possible for the determining device to determine that the formation of the fastener is defective. Furthermore, with this fastening apparatus, because it is possible to determine whether the fastener has passed or failed using the determining device, it is easy to discover a defectively deformed fastener, and, in addition, even if imperfect fastening work occurs owing to a defectively formed fastener, the discovery thereof is easy.

Therefore, according to the first fastening apparatus of the present teachings, the work of fastening the plurality of workpieces using the fastener made of a fiber-reinforced resin can be performed rapidly, and the quality of the work of fastening the workpieces can be increased.

In the first fastening apparatus, the fastener-forming die can comprise a first die and a second die opposing the first die. Furthermore, it is preferable that the shaft-part pressure-applying device causes the first die to approach the second die at a first speed until the first die comes into contact with the shaft part, and when the first die comes into contact with the shaft part, the shaft-part pressure-applying device causes the first die to approach the second die at a second speed, which is slower than the first speed.

In such an embodiment, the first die can be moved toward the second die rapidly until the first die comes into contact with the shaft part, and, in contrast, after the first die has come into contact with the shaft part, pressure is carefully applied to the fastener-forming die. Consequently, it becomes possible to suitably form the fastener while performing the work of fastening the workpieces rapidly.

In the first fastening apparatus, the fiber-reinforced thermoplastic resin preferably is a carbon-fiber-reinforced thermoplastic resin (polymer).

In such an embodiment, the fastener is advantageously reinforced with carbon fibers. Consequently, even in the situation in which, for example, a large load acts on the workpieces, the first and second head parts of the fastener tend not to be deformed by the workpieces, and the fastening of the workpieces tends not to be released (broken). Thereby, according to this fastening apparatus, the workpieces can be securely fastened by the fastener, which is made of a carbon-fiber-reinforced thermoplastic resin.

In the above-mentioned embodiment, the fastening device preferably comprises a high-frequency induction coil, which is capable of inductively heating the shaft part.

With such a fastening apparatus, the shaft part is heated by the high-frequency induction coil in a non-contacting state while the shaft part is inserted through the through holes of the workpieces. If the intermediate piece is made of a carbon-fiber-reinforced thermoplastic resin, the intermediate piece, including the shaft part, is electrically conductive. Consequently, the high-frequency induction coil can directly and in a non-contacting manner heat the shaft part by induction heating of the carbon fibers. Owing to the non-contacting heating, the softened resin (thermoplastic polymer) tends not to adhere to the heat source. In addition, because the carbon fibers also have excellent heat transfer properties, heat easily transfers throughout the entire intermediate piece, and therefore the entire intermediate piece readily softens in a comparatively short time.

A second fastening apparatus of the present teachings is a fastening apparatus that fastens a plurality of workpieces, through which through holes are provided, using a fastener, wherein:

a shaft body extending in an axial direction is used;

comprising:

a fastening device in which, by heating in a non-contacting state and then applying pressure while the shaft body is inserted through the through holes of the workpieces, the shaft body is formed (re-shaped) into a first head part, a shaft part formed integrally with the first head part and extending in the axial direction, and a second head part opposing the first head part, and the shaft body serves as (becomes) the fastener; and a determining device that determines whether the fastener has passed or failed (i.e. is defective or not defective);

wherein:

the shaft body is made of a fiber-reinforced thermoplastic resin;

the fastening device comprises:

a fastener-forming die that is capable of forming the fastener from the heated shaft body; and a shaft-body pressure-applying device that is capable of applying pressure to the fastener-forming die; and the determining device calculates a load curve defined by the time and the load during which pressure is applied and determines whether an amount of change per unit of time in the load curve after a reference load has been exceeded is within a range of a first reference value that is set in advance.

With the second fastening apparatus of the present teachings, the shaft body is heated in a non-contacting state while the shaft body is inserted through the through holes of the workpieces. Consequently, with this fastening apparatus, too, there is no need to heat the fastener-forming die in order to heat the shaft body, and, when the fastener is being formed from the shaft body, the heat of the shaft body can be absorbed by the fastener-forming die. Thereby, with this fastening apparatus, too, the formed fastener can be cooled quickly.

In addition, with this fastening apparatus, too, the determining device calculates the load curve, which is defined by the time and the load during the application of pressure, and determines whether the amount of change per unit of time in the load curve after the reference load has been exceeded is within a range of the first reference value, which is set in advance. If buckling, a crack, or the like occurs in the shaft part, the shaft body, or the like during the formation of the fastener, then the amount of change per unit of time in the load curve after the reference load has been exceeded is outside the range of the first reference value. Thereby, it becomes possible for the determining device to determine that the formation of the fastener is defective. Furthermore, with this fastening apparatus, too, because it is possible to determine whether the fastener has passed or failed using the determining device, it is easy to discover a defectively deformed fastener, and, in addition, even if imperfect fastening work occurs owing to a defectively formed fastener, the discovery thereof is easy.

Therefore, according to the second fastening apparatus of the present teachings, too, the work of fastening the plurality of workpieces using the fastener made of a fiber-reinforced resin can be performed rapidly, and the quality of the work of fastening the workpieces can be increased.

In particular, with the second fastening apparatus, by simultaneously forming the first head part, the second head part, and the shaft part from the shaft body, the fastener can be directly formed from the shaft body without using the intermediate piece. Consequently, with the second fastening apparatus, the work of fastening the workpieces can be performed more rapidly than the first fastening apparatus.

In the second fastening apparatus, the fastener-forming die can comprise a first die and a second die opposing the first die. Furthermore, it is preferable that the shaft-body pressure-applying device causes the first die to approach the second die at a first speed until the first die comes into contact with the shaft body, and when the first die comes into contact with the shaft body, the shaft-body pressure-applying device causes the first die to approach the second die at a second speed, which is slower than the first speed. In this situation, too, the fastener can be suitably formed while the work of fastening the workpieces is performed rapidly.

In the second fastening apparatus, the fiber-reinforced thermoplastic resin preferably is a carbon-fiber-reinforced thermoplastic resin (polymer).

In such an embodiment, the fastener is advantageously reinforced with carbon fibers. Consequently, even in the situation in which, for example, a large load acts on the workpieces, the first and second head parts of the fastener tend not to be deformed by the workpieces, and the fastening of the workpieces tends not to be released (broken). Thereby, according to this fastening apparatus, the workpieces can be securely fastened by the fastener, which is made of a carbon-fiber-reinforced thermoplastic resin.

In the above-mentioned embodiment, the fastening device preferably comprises a high-frequency induction coil, which is capable of inductively heating the shaft body.

With such a fastening apparatus, the shaft body is heated by the high-frequency induction coil in a non-contacting state while the shaft body is inserted through the through holes of the workpieces. If the shaft body also is made of a carbon-fiber-reinforced thermoplastic resin, the same as in the above-mentioned intermediate piece, the high-frequency induction coil can directly and in a non-contacting manner heat the shaft body by induction heating of the carbon fibers. Owing to the noncontacting heating, the softened resin (thermoplastic polymer) tends not to adhere to the heat source. In addition, because the carbon fibers also have excellent heat transfer properties, heat easily transfers throughout the entire fastener, and therefore the entire fastener readily softens in a comparatively short time.

In the first fastening apparatus and the second fastening apparatus, it is preferable that an adapted load curve, which is calculated by differentiating the load curve with respect to time, is used together with the load curve. The differentiation is not limited to a first-order differentiation; instead an $n^{th}$ order differentiation may be performed.

In the first fastening apparatus and the second fastening apparatus, it is preferable that the determining device determines whether the amount that the load curve falls after a first peak, which first appears after the application of pressure, is within a range of a second reference value, which is set in advance.

When heating of the shaft part, the shaft body, or the like is insufficient and therefore the shaft part, the shaft body, or the like is not sufficiently brought to the plastically deformable softened state, or, in contrast, when heating of the shaft part, the shaft body, or the like is excessive and therefore the shaft part, the shaft body, or the like is softened more than necessary, the amount that the load curve falls after the first peak is outside the range of the second reference value, which is set in advance. Consequently, even in such situations, it becomes possible for the determining device to determine that the formation of the fastener is defective.

In addition, in such embodiments, the determining device preferably determines whether a peak-to-peak time until a second peak, which appears after the first peak, on the load curve is within a range of a third reference value, which is set in advance.

If the heating of the shaft part, the shaft body, or the like is insufficient or excessive, the peak-to-peak time on the load curve is outside the range of the third reference value. Consequently, such an embodiment makes it possible for the determining device to more suitably determine that the formation of the fastener is defective.

The first fastening apparatus and the second fastening apparatus preferably further comprise a recording device (memory) that records (stores) the determination result of the determining device. In such embodiments, quality control of the fastener and, in turn, quality control of the work of fastening the workpieces together can be suitably performed.

A first fastener pass/fail determining method of the present teachings is a fastener pass/fail determining method that fastens a plurality of workpieces, through which through holes are provided, by performing a shaft-part heating process and a fastening process, wherein:

in the shaft-part heating process, an intermediate piece, which is made of a fiber-reinforced thermoplastic resin (polymer) and comprises a first head part and a shaft part formed integrally with the first head part and extending in an axial direction, is used, and the shaft part is heated in a non-contacting state while the shaft part is inserted through the through holes of the workpieces;

in the fastening process, the workpieces are fastened by applying pressure to a fastener-forming die using a shaft-part pressure-applying device, forming a second head part, which is formed integrally with the shaft part and opposes the first head part, from the heated shaft part using the fastener-forming die, and having the intermediate piece serve as (become) the fastener; and the pass/fail determining method calculates a load curve, which is defined by the time and the load during the application of pressure, and determines whether an amount of change per unit of time in the load curve after a reference load has been exceeded is within a range of a first reference value, which is set in advance.

In the first fastener pass/fail determining method, the fastener-forming die can comprise a first die and a second die opposing the first die. Furthermore, it is preferable that the shaft-part pressure-applying device causes the first die to approach the second die at a first speed until the first die comes into contact with the shaft part, and when the first die comes into contact with the shaft part, the shaft-part pressure-applying device causes the first die to approach the second die at a second speed, which is slower than the first speed.

In the first fastener pass/fail determining method, the fiber-reinforced thermoplastic resin (polymer) preferably is a carbon-fiber-reinforced thermoplastic resin.

In such embodiments, in the shaft-part heating process, the shaft part preferably is inductively heated by the high-frequency induction coil.

A second fastener pass/fail determining method of the present teachings is a fastener pass/fail determining method that fastens a plurality of workpieces, through which through holes are provided, by performing a shaft-body heating process and a fastening process, wherein:

in the shaft-body heating process, a shaft body made of a fiber-reinforced thermoplastic resin and extending in an axial direction is used, and the shaft body is heated in a non-contacting state while the shaft body is inserted through the through holes of the workpieces;

in the fastening process, the workpieces are fastened by applying pressure to a fastener-forming die using a shaft-body pressure-applying device, and forming the fastener from the heated shaft body using the fastener-forming die; and the pass/fail determining method calculates a load curve defined by the time and the load during which pressure is applied and determines whether an amount of change per unit of time in the load curve after a reference load has been exceeded is within a range of a first reference value that is set in advance.

In the second fastener pass/fail determining method, the fastener-forming die preferably comprises a first die and a second die opposing the first die. Furthermore, it is preferable that the shaft-body pressure-applying device causes the first die to approach the second die at a first speed until the first die comes into contact with the shaft body, and when the first die comes into contact with the shaft body, the shaft-body pressure-applying device causes the first die to approach the second die at a second speed, which is slower than the first speed.

In the second fastener pass/fail determining method, the fiber-reinforced thermoplastic resin (polymer) preferably is a carbon-fiber-reinforced thermoplastic resin.

In such embodiments, in the shaft-body heating process, the shaft body preferable is inductively heated using a high-frequency induction coil.

In the first fastener pass/fail determining method and the second fastener pass/fail determining method, it is preferable that an adapted load curve, which is calculated by differentiating the load curve with respect to time, is used together with the load curve.

In the first fastener pass/fail determining method and the second fastener pass/fail determining method, it is preferable that it is determined whether the amount that the load curve falls after a first peak, which first appears after the application of pressure, is within a range of a second reference value, which is set in advance.

In addition, such embodiments, it is preferable that it is determined whether a peak-to-peak time until a second peak, which appears after the first peak, on the load curve is within a range of a third reference value, which is set in advance.

In the first fastener pass/fail determining method and the second fastener pass/fail determining method, it is preferable that the determination result is recorded (stored).

According to the first fastening apparatus, the second fastening apparatus, the first fastener pass/fail-determining method, and the second fastener pass/fail-determining method of the above-mentioned aspects of the present teachings, it is possible to rapidly perform the work of fastening a plurality of workpieces using a fastener made of a fiber-reinforced resin and to increase the quality of the work of fastening the workpieces.

BRIEF DESCRIPTION OF THE DRAWINGS

FIG. 10 is a principal-parts enlarged cross-sectional view that shows, according to the fastening apparatus of working example 1, the state in which a head-part forming die has been brought into contact with the shaft part.

FIG. 11 is a principal-parts enlarged cross-sectional view that shows, according to the fastening apparatus of working example 1, the state in which a second head part is formed, and the workpieces are fastened by a fastener.

DETAILED DESCRIPTION OF THE PREFERRED EMBODIMENTS

Working examples 1, 2, which embody aspects of the present teachings, are explained below, with reference to the drawings.

Working Example 1

Figure 1:
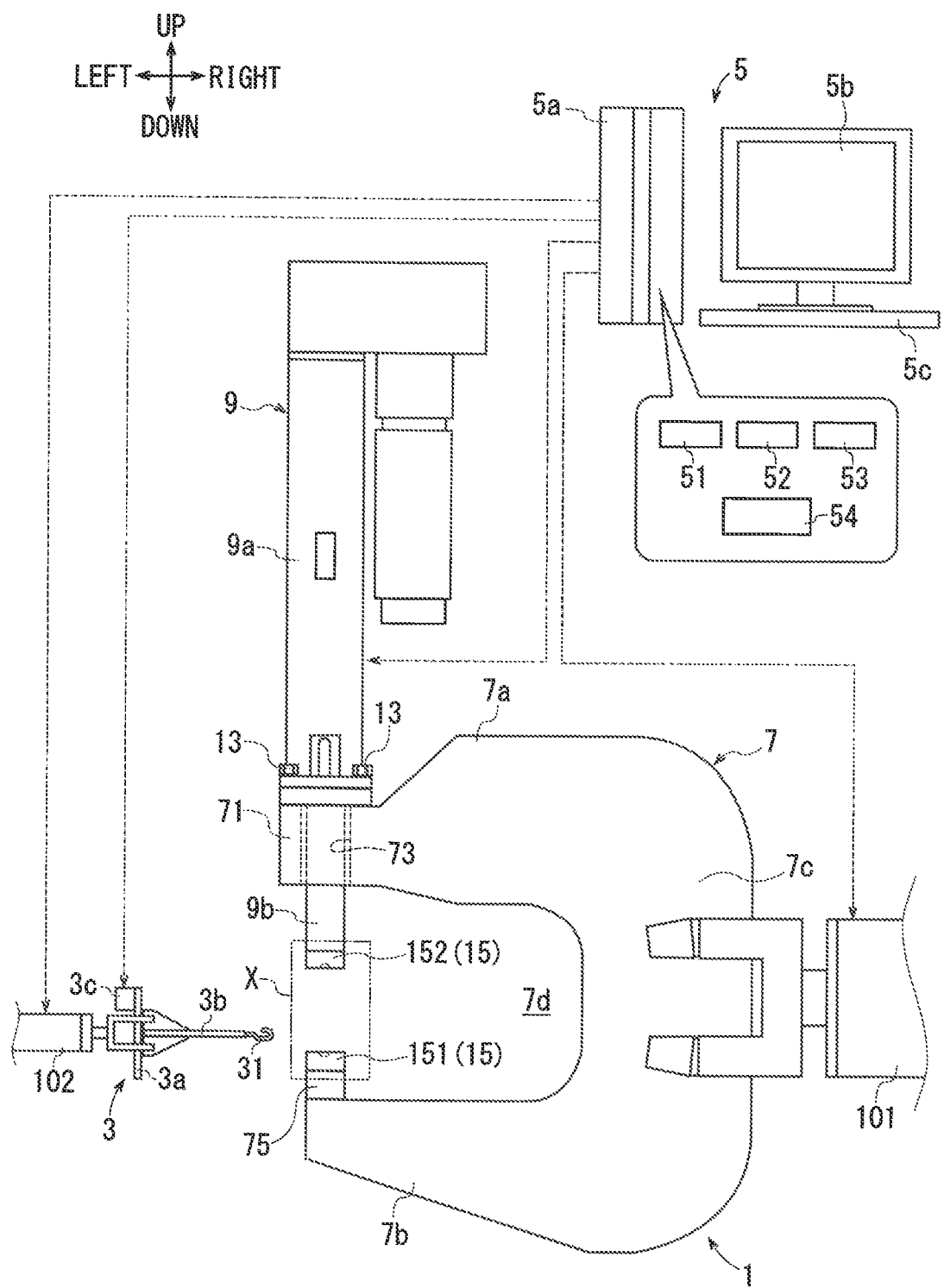
FIG. 1 is a schematic drawing that shows a fastening apparatus of working example 1 according to the present teachings.
Figure 12:
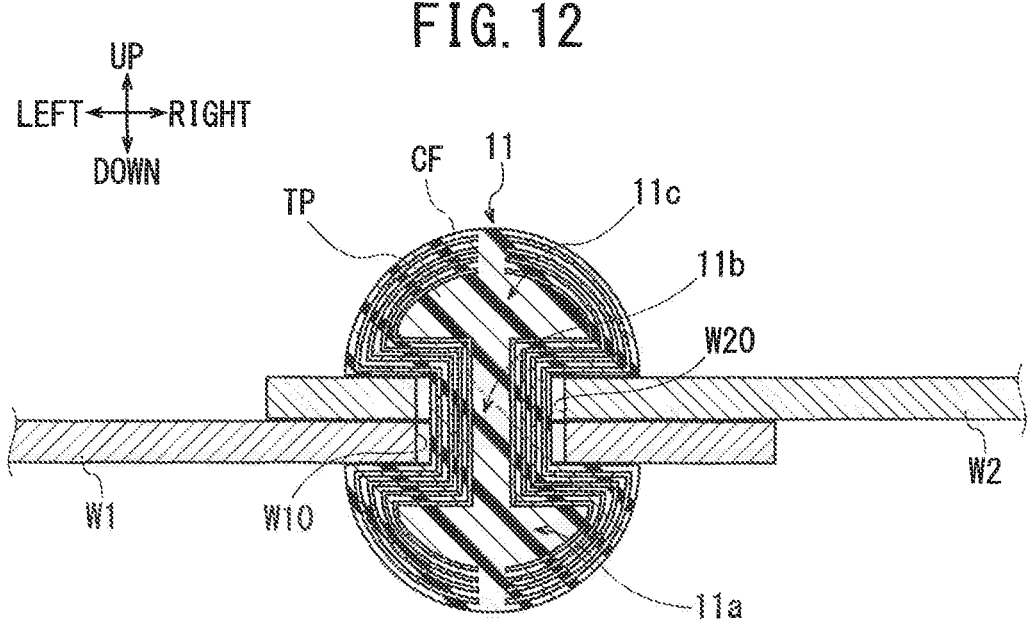
FIG. 12 is a principal-parts enlarged cross-sectional view that shows a fastener that has fastened workpieces according to the fastening apparatus of working example 1.

As shown in FIG. 1, the fastening apparatus of working example 1 comprises a press unit 1, a high-frequency induction heater 3, and a control computer 5. The press unit 1 and the high-frequency induction heater 3 constitute a "fastening device" in the present teachings. With this fastening apparatus, the work of fastening a first workpiece W1, which is made of metal, and a second workpiece W2, which is also made of metal, using a fastener 11 is performed, as shown in FIG. 12. It is noted that the material of the first workpiece W1 and the second workpiece W2 can be changed as appropriate.

In the present working example, upward of the paper surface in FIG. 1 represents upward of the fastening apparatus, downward of the paper surface in FIG. 1 represents downward of the fastening apparatus, and thereby an up-down direction of the fastening apparatus is defined. In addition, rightward of the paper surface in FIG. 1 represents rightward of the fastening apparatus, leftward of the paper surface in FIG. 1 represents leftward of the fastening apparatus, and thereby a left-right direction of the fastening apparatus is defined. In addition, FIGS. 7, 8, 10, 11, 17-20 are cross-sectional views in which area X in FIG. 1 is enlarged. Furthermore, in FIG. 7, etc., the up-down direction and the left-right direction are defined in correspondence with FIG. 1. It is noted that the up-down direction and the left-right direction are but one example and can be modified as appropriate.

As shown in FIG. 1, the press unit 1 comprises a support member 7 and a servo press 9. The support member 7 comprises an upper-end part 7a located on an upper side, a lower-end part 7b located on a lower side, and a grasp part 7c that connects the upper-end part 7a and the lower-end part 7b and is substantially U-shaped. In addition, in the support member 7, a work space (gap) 7d is formed between the upper-end part 7a and the lower-end part 7b. A first pedestal 71 for mounting the servo press 9 is provided on the upper-end part 7a. A through hole 73, which faces the work space 7d and extends in the up-down direction, is formed in the first pedestal 71. A second pedestal 75 is provided, such that it is located inside the work space 7d, on the lower-end part 7b. A holding die 151, which constitutes part of a fastener-forming die 15 that is described below, is mountable on the second pedestal 75. The work space 7d is open leftward, and a (first) high-frequency induction coil 3b of the high-frequency induction heater 3 is capable of advancing therein. The grasp part 7c is rightward of the work space 7d and extends in the up-down direction.

The servo press 9 comprises a press main body 9a and a press head 9b. The servo press 9 is one example of a "shaft-body pressure-applying device" and a "shaft-part pressure-applying device" in the present teachings. Although not illustrated, in addition to a servomotor and a press controller that controls the operation of the servomotor, a load-detecting sensor that detects a load that acts on the fastener-forming die 15 via the press head 9b and the like are provided inside the press main body 9a. The press head 9b is mounted on the press main body 9a. The press head 9b is capable of advancing and retracting relative to the press main body 9a while the speed, the load, or the like is appropriately changed by the servomotor. A head-part forming die 152, which is described below, is mounted on the press head 9b.

Figure 7:
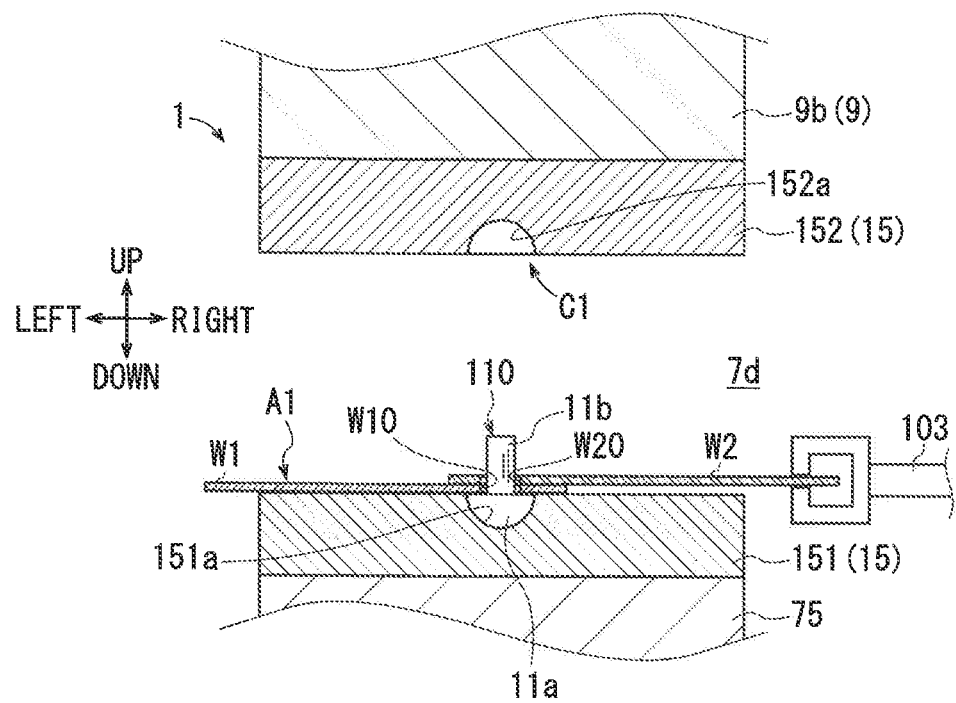
FIG. 7 is a principal-parts enlarged cross-sectional view that shows, according to the fastening apparatus of working example 1, the state in which the intermediate piece, whose shaft part is inserted through the through hole of each workpiece, is held by a holding die.
Figure 8:
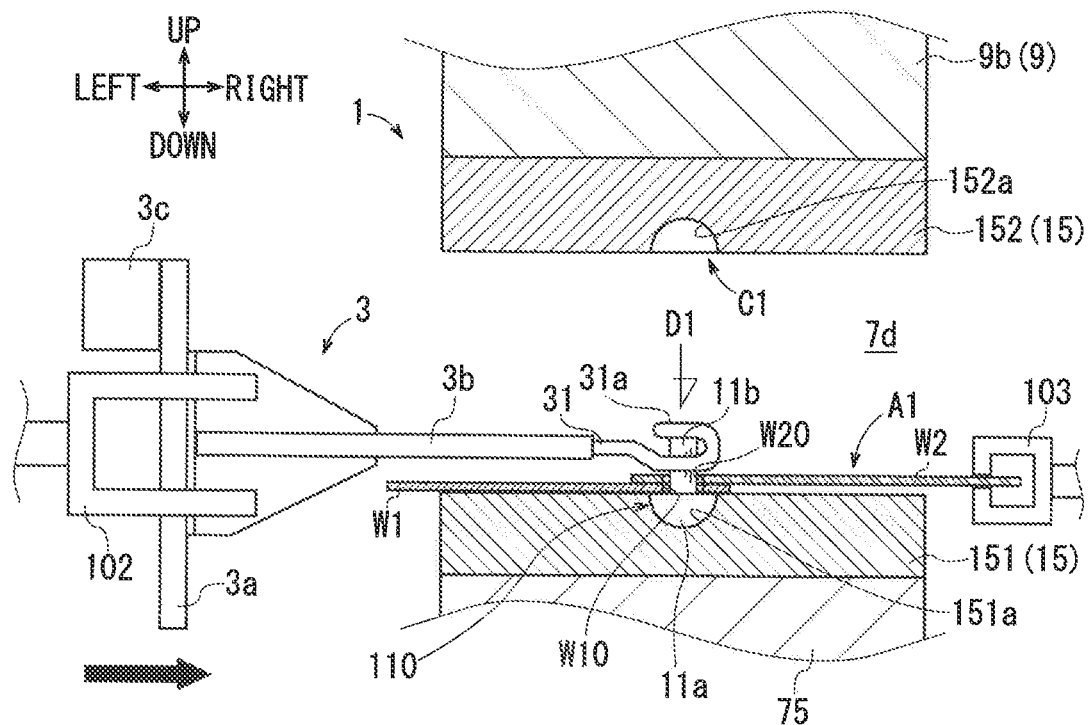
FIG. 8 is a principal-parts enlarged cross-sectional view that shows, according to the fastening apparatus of working example 1, the state in which the shaft part is being inductively heated by a high-frequency induction coil.
Figure 20:
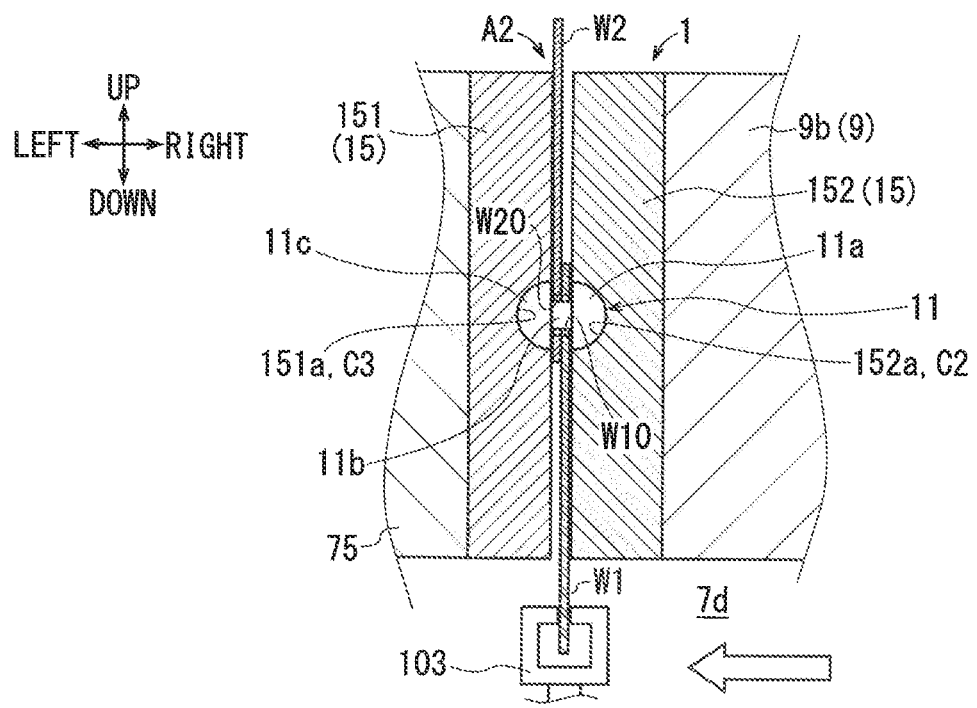
FIG. 20 is a principal-parts enlarged cross-sectional view that shows, according to the fastening apparatus of working example 2, the state in which a first head part, the second head part, and the shaft part are formed, and the workpieces are fastened by the fastener.

In the press unit 1, the press main body 9a is fixed, by a plurality of bolts 13, to the first pedestal 71 in the state in which the press head 9b is inserted through the through hole 73. Thus, in the press unit 1, the support member 7 and the servo press 9 are integrated. Furthermore, by advancing and retracting the press head 9b relative to the press main body 9a and thereby moving the press head 9b along its own axial direction inside the work space 7d, the press head 9b is displaceable to (i) an initial position shown in FIG. 1, (ii) a standby position shown in FIG. 7, FIG. 8, etc., and (iii) a press position shown in FIG. 11 and FIG. 20. The initial position is the position at which the press head 9b is farthest from the second pedestal 75 inside the work space 7d, as shown in FIG. 1. The standby position is the position at which the press head 9b is closer to the second pedestal 75, inside the work space 7d, than it is at the initial position, as shown in FIG. 7, FIG. 8, etc. The press position is the position at which the press head 9b is closest to the second pedestal 75 inside the work space 7d, as shown in FIG. 11 and FIG. 20.

In addition, in this fastening apparatus, the press unit 1 is held by a first work arm 101, as shown in FIG. 1. Specifically, the first work arm 101 holds the press unit 1 by grasping the grasp part 7c of the support member 7. Although a detailed illustration is not shown, the first work arm 101 is configured such that it is capable of pivoting, extending, and retracting while it is grasping the grasp part 7c. Therefore, under the control of the control computer 5, the first work arm 101 can hold the press unit 1 at an arbitrary angle.

Figure 9:
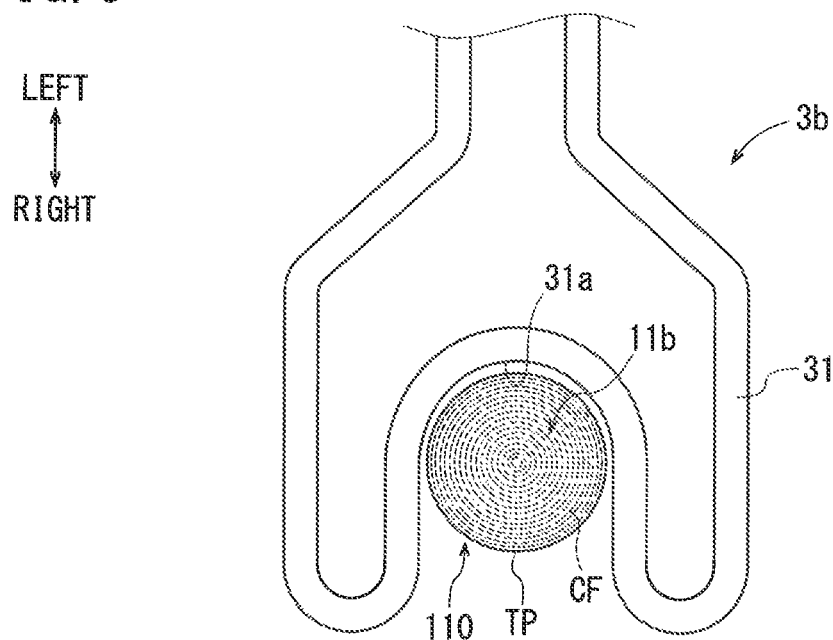
FIG. 9 is a top view for the situation in which, according to the fastening apparatus of working example 1, the shaft part and the high-frequency induction coil are viewed from direction D1 in FIG. 8.

As shown in FIG. 1 and FIG. 8, the high-frequency induction heater 3 comprises a main-body part 3a, the first high-frequency induction coil 3b, an energization controller 3c, and a temperature sensor that is not shown. The first high-frequency induction coil 3b is one example of a "high-frequency induction coil" in the present teachings. The main-body part 3a is held by a second work arm 102. The first high-frequency induction coil 3b is fixed to the main-body part 3a and extends from the main-body part 3a side toward the work space 7d side of the support member 7. As shown in FIG. 9, one tip part 31 is provided on the work space 7d side in (on) the high-frequency induction coil 3b. A recessed part 31a that is capable of enveloping (configured to partially surround) a shaft part 11b, which is described below, is formed in the tip part 31. The energization controller 3c shown in FIG. 1 and FIG. 8 is fixed to the main-body part 3a. Under the control of the control computer 5, the energization controller 3c supplies electric power to the first high-frequency induction coil 3b. The temperature sensor detects the surface temperature of the shaft part 11b.

Figure 18:
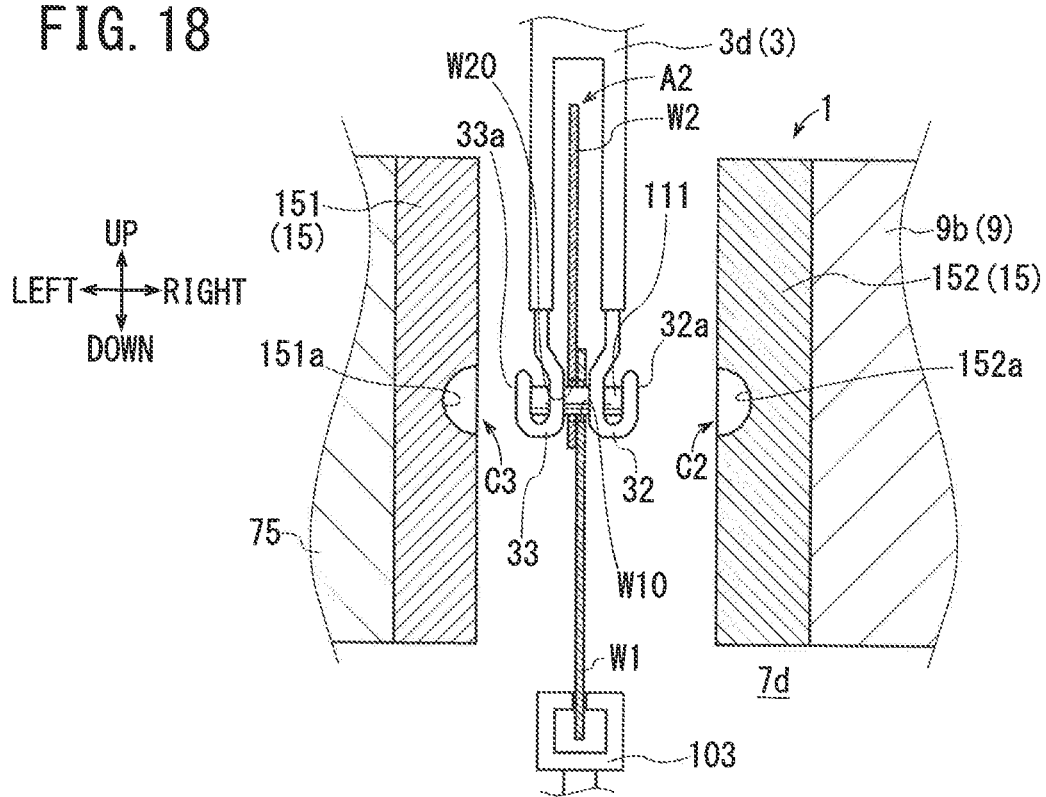
FIG. 18 is a principal-parts enlarged cross-sectional view that shows, according to the fastening apparatus of working example 2, the state in which the shaft body is being inductively heated by high-frequency induction coils.
Figure 19:
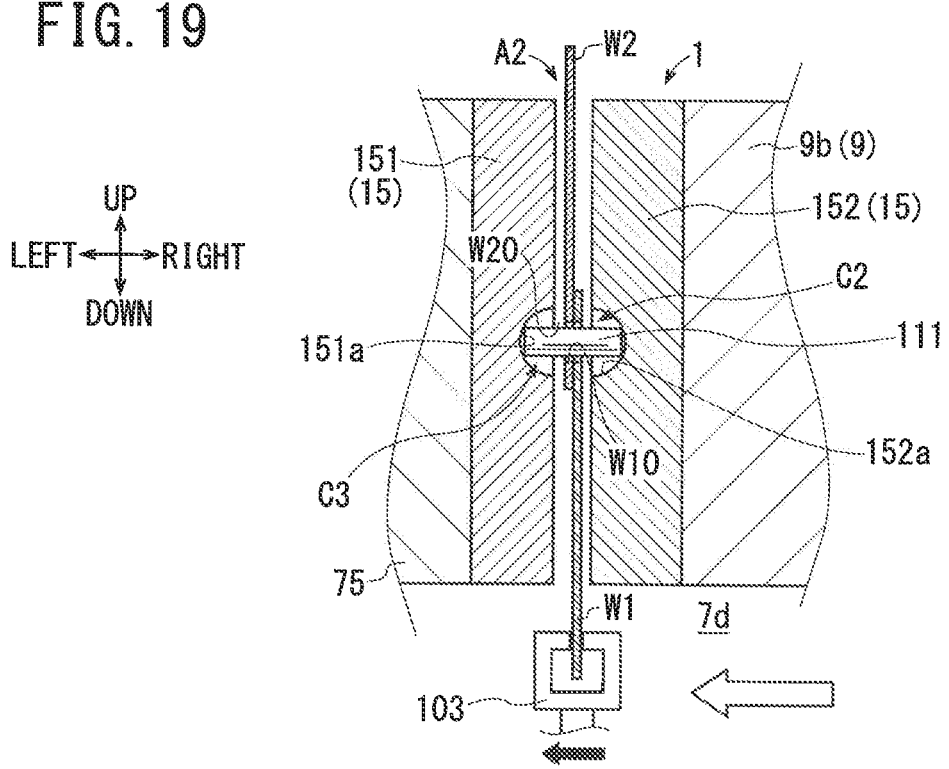
FIG. 19 is a principal-parts enlarged cross-sectional view that shows, according to the fastening apparatus of working example 2, the state in which the head-part forming die and the holding die are brought into contact with the shaft body.

The second work arm 102 is configured such that it is capable of pivoting, advancing, and retracting while it grasps the main-body part 3a. Thereby, under the control of the control computer 5, the second work arm 102 can hold the first high-frequency induction heater 3 at an arbitrary angle. In addition, under the control of the control computer 5, the second work arm 102 can move the main-body part 3a and thereby displace the first high-frequency induction coil 3b to a retracted position as shown in FIG. 1 and to a heating position as shown in FIG. 8 and FIG. 18. The retracted position is a position at which the first high-frequency induction coil 3b is withdrawn from the interior of the work space 7*d*, as shown in FIG. 1. The heating position is a position at which the first high-frequency induction coil 3*b* has advanced into the work space 7*d*, as shown in FIG. 8 and FIG. 18.

The control computer 5 shown in FIG. 1 executes such control by sending control signals to the servo press 9, the energization controller 3*c*, the first work arm 101, the second work arm 102, and a third work arm 103, which is described below. Furthermore, the control computer 5 also functions as a "determining device" in the present teachings and determines whether the fastener 11 has passed or failed (i.e. whether the fastener 11 is defective or not).

The control computer 5 comprises a computer main body 5*a*, a display 5*b*, and a keyboard 5*c*. An operator, who is not shown, can input via the keyboard 5*c* work data, such as the shape, the material, and the like of the first and second workpieces W1, W2, in addition to the dimensions of an intermediate piece (rivet) 110, a shaft body 111, and the like, which are described below.

ROM 51, RAM 52, a CPU 53, storage 54, and the like are housed inside the computer main body 5*a*. Various control programs, which control the servo press 9, the energization controller 3*c*, the first to third work arms 101-103, and the like, are stored in the ROM 51. In addition, first to fifth reference values, in addition to a calculating program for calculating the load curve shown in FIG. 13, the adapted load curves shown in FIG. 14 and FIG. 15, and the like, are stored in the ROM 51. Furthermore, a determining program for determining whether the fastener 11 has passed or failed is stored in the ROM 51.

Load curves, adapted load curves, and the like in addition to work data, which is input via the keyboard 5*c*, are stored in the RAM 52. Based on the control programs stored in the ROM 51 and the work data stored in the RAM 52, the CPU 53 performs (executes) various operations to control the servo press 9 and the like. In addition, the CPU 53 calculates the load curves and calculates the adapted load curves from those load curves. In addition, the CPU 53 determines whether the fastener 11 has passed or failed based on the first to fifth reference values and the determining program.

The storage 54 is one example of a "recording device" in the present teachings. The storage 54 comprises a magnetic disk, a silicon disk, or the like, and records the load curves calculated by the CPU 53 in addition to recording the result of the determination of the pass/fail of the fastener 11 by the CPU 53. The work data input by the operator as well as the operating state of the fastening apparatus and the like are displayed on the display 5*b*. Furthermore, in addition to the adapted load curves calculated by the CPU 53, the result of the determination whether the fastener 11 has passed or failed is displayed on the display 5*b*. It is noted that the details of the load curves, the adapted load curves, and the first to fifth reference values are described below.

Figure 2:
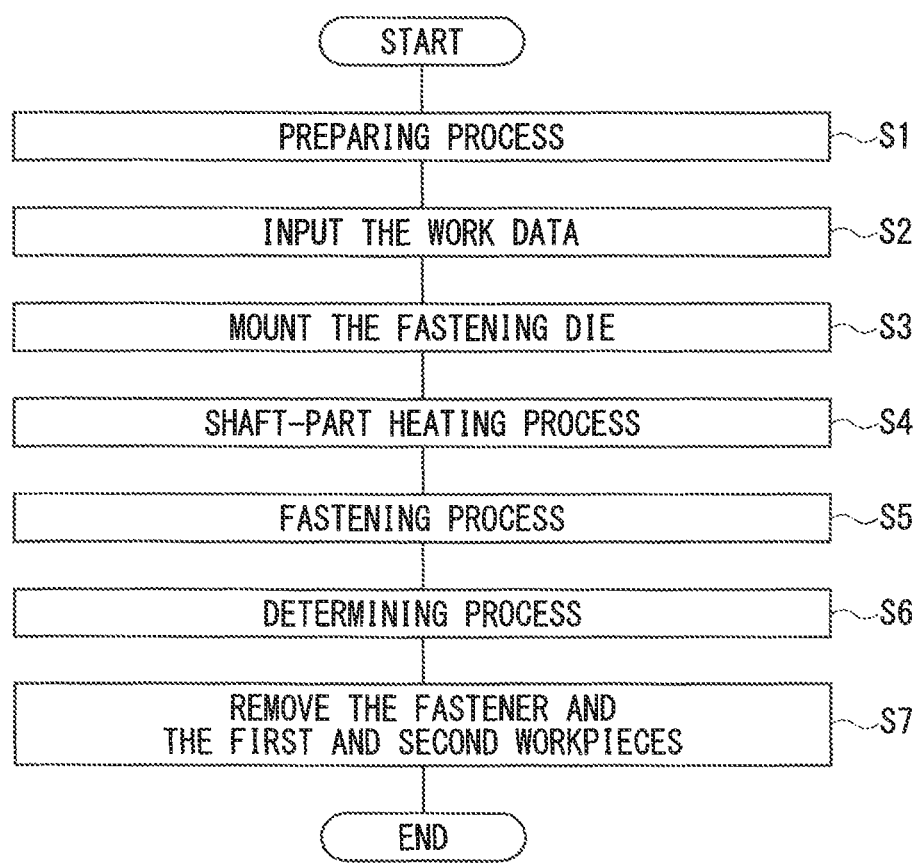
FIG. 2 is a flow chart for explaining how the work of fastening workpieces is performed by the fastening apparatus of working example 1.
Figure 6:
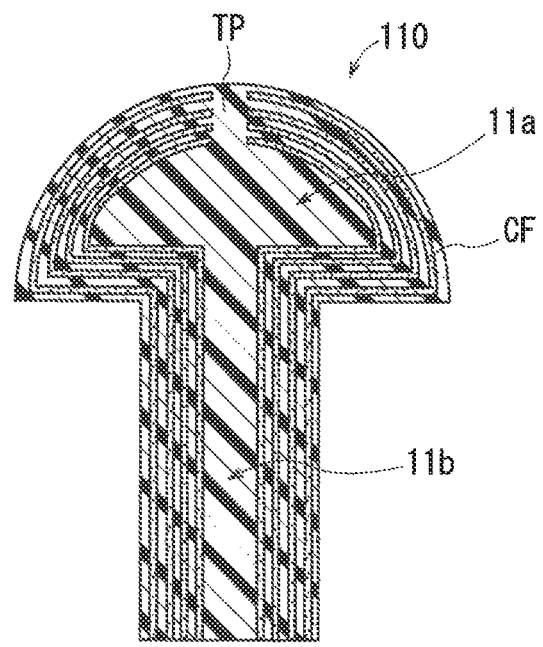
FIG. 6 is a cross-sectional view that shows an intermediate piece.

With the fastening apparatus configured as described above, the work of fastening the first workpiece W1 and the second workpiece W2 using the fastener 11 is performed in accordance with the flow chart shown in FIG. 2. This is explained in detail below. First, as a preparing process, the first workpiece W1 and the second workpiece W2 shown in FIG. 12 are prepared, and the intermediate piece 110 shown in FIG. 6 is prepared (provided) (step S1). As shown in FIG. 12, a through hole W10 is provided through the first workpiece W1, and a through hole W20 is provided through the second workpiece W2. The through hole W10 and the through hole W20 have the same diameter, and the shaft part 11*b* of the intermediate piece 110, which is described below, is insertable therethrough.

As shown in FIG. 6, the intermediate piece 110 is composed of a thermoplastic resin (polymer) TP, such as nylon, and a plurality of carbon fibers CF. That is, the intermediate piece 110 is made of a carbon-fiber-reinforced thermoplastic resin (CFRTP). The intermediate piece 110 comprises a first head part 11*a* and the shaft part 11*b*. The first head part 11*a* is formed into a substantially semispherical shape, the diameter of which is larger than that of the through hole W10 and the through hole W20. The shaft part 11*b* is formed into a circular-columnar shape, the diameter of which is smaller than that of the first head part 11*a*. One-end side of the shaft part 11*b* is integral with the first head part 11*a*, and the other-end side of the shaft part 11*b* extends in a straight line along the axial direction. The dimensions of the intermediate piece 110, including the size of the diameter of the first head part 11*a*, the length of the shaft part 11*b* in the axial direction, and the like, are defined in accordance with the shapes of the first and second workpieces W1, W2 to be fastened. In addition, each of the carbon fibers CF extends from the first head part 11*a* to the end part on the other-end side of the shaft part 11*b*. It is noted that, in FIG. 6 and FIG. 12, to facilitate the explanation, the number of the carbon fibers CF is simplified, and the shapes of the carbon fibers CF are shown in an exaggerated manner. In addition, the first head part 11*a* may have another shape as long as its diameter is greater than that of the through holes W10, W20. Likewise, the shaft part 11*b* is not limited to having a circular-columnar shape and may have some other shape.

Next, the operator inputs the required work data via the keyboard 5*c* (step S2 in FIG. 2). Then, the operator sends, using the control computer 5, a control signal to the first and second work arms 101, 102 to start control of the first and second work arms 101, 102. Thereby, as shown in FIG. 1, the first work arm 101 holds the press unit 1 in the state in which the servo press 9 is stood up in the up-down direction. In addition, the second work arm 102 positions the high-frequency induction heater 3 leftward of the press unit 1.

Next, the operator mounts a fastener-forming die 15 on the press unit 1 (step S3 in FIG. 2). As shown in FIG. 7, the fastener-forming die 15 comprises the holding die 151 and the head-part forming die 152. The holding die 151 is one example of a "second die" in the present teachings, and the head-part forming die 152 is one example of a "first die" in the present teachings. A first recessed part 151*a*, which is capable of holding the first head part 11*a* of the intermediate piece 110 and has a semispherical shape, is formed in the second holding die 171. The holding die 151 is mounted on the second pedestal 75 of the support member 7 in the state in which the first recessed part 151*a* faces the press head 9*b* side. A second recessed part 152*a*, which has a semispherical shape, is formed in the head-part forming die 152. The second recessed part 152*a* is formed with a diameter the same as that of the first recessed part 151*a*. The head-part forming die 152 is mounted on the press head 9*b* in the state in which the second recessed part 152*a* faces the holding die 151 side. A first cavity C1 is formed between the second recessed part 152*a* and the second workpiece W2. It is noted that the second recessed part 152*a* may have a diameter that differs from that of the first recessed part 151*a*.

Next, a shaft-part heating process is performed (step S4 in FIG. 2). This shaft-part heating process is performed based on the control flow shown in FIG. 3. In this shaft-part heating process, the shaft part 11*b* of the intermediate piece 110 is heated in the noncontacting state while the shaft part 11*b* is inserted through the through holes W10, W20 of the first and second workpieces W1, W2. First, the operator sends, using the control computer 5, a control signal to the third work arm 103 shown in FIG. 7. Thereby, the third work arm 103 conveys the intermediate piece 110 to the holding die 151 and places the first head part 11*a* in the first recessed part 151*a*. Thus, the first head part 11*a* is caused to be held by the holding die 151 (step S401). Thereby, the intermediate piece 110 is oriented such that the other-end side of the shaft part 11*b* extends toward the second recessed part 152*a* of the head-part forming die 152. In addition, the third work arm 103 conveys the first workpiece W1 to the intermediate piece 110 and inserts the shaft part 11*b* through the through hole W10. Thereby, the first workpiece W1 is placed on the holding die 151. Furthermore, while conveying the second workpiece W2 to the intermediate piece 110 and aligning the through hole W10 and the through hole W20, the third work arm 103 inserts the shaft part 11*b* through the through hole W20. Thus, the first workpiece W1, the second workpiece W2, and the intermediate piece 110 constitute a first assembly A1. It is noted that, because the third work arm 103 continues to hold the second workpiece W2 after inserting the shaft part 11*b* through the through hole W20, the third work arm 103 continues to hold the first assembly A1. In addition, although the shapes of the through holes W10, W20 are shown in an exaggerated manner in FIG. 7, etc. to facilitate the explanation, the through holes W10, W20 and the shaft part 11*b* are formed with substantially the same diameter.

Figure 3:
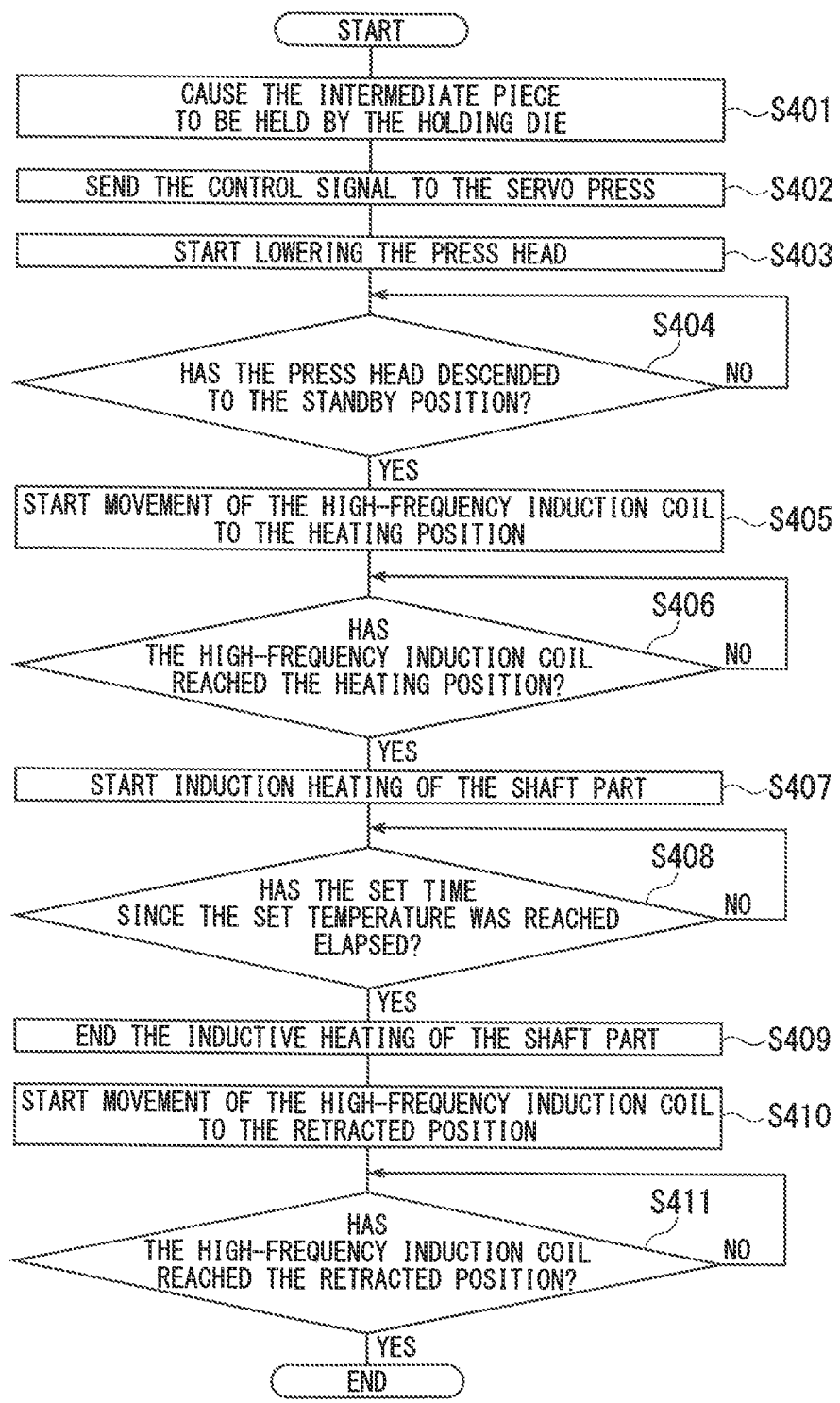
FIG. 3 is a control flow for explaining how a shaft-part heating process is performed by the fastening apparatus of working example 1.

After causing the intermediate piece 110 to be held by the first holding die 151, the operator sends, using the control computer 5, a control signal to the servo press 9 (step S402 in FIG. 3). Thereby, in the press unit 1, the servo press 9 actuates the press head 9*b*. Consequently, the press head 9*b* starts to descend from the initial position shown in FIG. 1 toward the second pedestal 75 and, in turn, toward the holding die 151 (step S403 in FIG. 3). The descending of the press head 9*b* continues until the press head 9*b* reaches the standby position (step S404: NO). Furthermore, as shown in FIGS. 7, 8, when the press head 9*b* reaches the standby position within the work space 7*d*, the servo press 9 stops the descending of the press head 9*b* (step S404: YES in FIG. 3).

Thus, when the press head 9*b* reaches the standby position, the control computer 5 sends a control signal to the second work arm 102. Thereby, as indicated by a black arrow in FIG. 8, the second work arm 102 moves the high-frequency induction heater 3 toward the press unit 1 and thus the first high-frequency induction coil 3*b* starts moving from the retracted position shown in FIG. 1 toward the heating position shown in FIG. 8 (step S405 in FIG. 3). Here, unless the first high-frequency induction coil 3*b* has reached the heating position, the second work arm 102 continues the movement of the high-frequency induction heater 3 (step S406: NO). Then, when the first high-frequency induction coil 3*b* reaches the heating position, the second work arm 102 stops the movement of the high-frequency induction heater 3 (step S406: YES).

As shown in FIG. 9, as of the first high-frequency induction coil 3*b* approaches the heating position, the tip part 31 of the first high-frequency induction coil 3*b* approaches the intermediate piece 110 within the work space 7*d* until the other-end (upper) side of the shaft part 11*b* is received within the recessed part 31*a* formed in the tip part 31. Here, even when the first high-frequency induction coil 3*b* reaches the heating position, the first high-frequency induction coil 3*b*, which has the recessed part 31*a*, does not contact the intermediate piece 110. It is noted that, in FIG. 9, to simplify the explanation, the illustration of the first and second workpieces W1, W2 and the like is omitted.

Thus, when the first high-frequency induction coil 3*b* is located at the heating position, the control computer 5 sends a control signal to the energization controller 3*c*. Thereby, the energization controller 3*c* starts the supply of electrical current to the first high-frequency induction coil 3*b*. Consequently, the first high-frequency induction coil 3*b* generates magnetic force lines. Here, because the intermediate piece 110 is made of CFRTP, the carbon fibers CF exhibit electrical conductivity and excellent heat transfer properties. Consequently, the shaft part 11*b*, which is received within the recessed part 31*a*, internally generates eddy currents owing to the effects of the magnetic force lines. Thereby, the shaft part 11*b* generates heat due to Joule heating caused by the eddy currents. Thus, induction heating of the shaft part 11*b* by the first high-frequency induction coil 3*b* is started (step S407 in FIG. 3). In addition, the temperature sensor detects the surface temperature of the shaft part 11*b*.

After the surface temperature of the other-end (upper) side of the shaft part 11*b* has reached a set temperature, which is set in advance by the control program, the induction heating of the shaft part 11*b* continues until a set time, which is set in advance, elapses (step S408: NO). Then, when the surface temperature of the other-end (upper) side of the shaft part 11*b* has reached the set temperature and the set time has elapsed (step S408: YES), the control computer 5 ends the supply of electrical current from the energization controller 3*c* to the induction coil 3. Thus, the induction heating of the shaft part 11*b* ends (step S409). By undergoing this induction heating, the other-end (upper) side of the shaft part 11*b* is brought to a plastically deformable softened state due to the generation of heat internally within the shaft part 11*b*.

When the induction heating of the shaft part 11*b* ends, the control computer 5 once again controls the second work arm 102 so as to separate (withdraw) the high-frequency induction heater 3 from the press unit 1. Thereby, the first high-frequency induction coil 3*b* starts moving from the heating position shown in FIG. 8 toward the retracted position shown in FIG. 1 (step S410 in FIG. 3). The movement of the high-frequency induction heater 3 by the second work arm 102 continues until the first high-frequency induction coil 3*b* reaches the retracted position (step S411: NO). Furthermore, when the first high-frequency induction coil 3*b* reaches the retracted position, the second work arm 102 stops the movement of the high-frequency induction heater 3 (step S410: YES). Thus, the shaft-part heating process ends.

Next, the fastening process is performed (step S5 in FIG. 2). The fastening process is performed based on the control flow shown in FIG. 4. In the fastening process, the control computer 5 controls the servo press 9. Thereby, as indicated by a white arrow in FIG. 10, the servo press 9 lowers the press head 9*b*, which is at the standby position, toward the press position (step S501 in FIG. 4). As described above, in the servo press 9, the press head 9*b* is capable of advancing and retracting relative to the press main body 9*a* while the speed, the load, or the like is appropriately changed by the servomotor. Consequently, when lowering the press head 9*b* from the standby position toward the press position, the control computer 5 lowers the press head 9*b* first at a first speed, thereby causing the head-part forming die 152 to approach the holding die 151. In addition, at this time, the control computer 5 sets the load of the press head 9*b* to a first load. Thus, the servo press 9 starts the application of pressure to the fastener-forming die 15 according to the first load.

Furthermore, while the press head 9*b* is being lowered toward the press position, the load-detecting sensor of the press main body 9a sends the detected load to the control computer 5. Thereby, in the control computer 5, the CPU 53 starts the calculation of the load curve based on the load detected by the load-detecting sensor (step S502). This load curve is defined by (a) the time during which pressure is applied to the fastener-forming die 15 by the servo press 9, (b) the load that acts on the fastener-forming die 15 via the press head 9b, and, in turn, (c) the load that acts on the intermediate piece 110 (refer to FIG. 13).

Thus, the press head 9b is lowered toward the press position and thereby the holding die 151 and the head-part forming die 152 approach one another. Consequently, because the intermediate piece 110 is held by the holding die 151, the other-end (upper) side of the shaft part 11b advances into the second recessed part 152a of the head-part forming die 152, as shown in FIG. 10. Then, when the other-end (upper) side of the shaft part 11b comes into contact with an inner-circumferential surface of the second recessed part 152a, the servo press 9 detects that the head-part forming die 152 has come into contact with the shaft part 11b and therefore sends a first contact detection signal to the control computer 5. The control computer 5 determines whether the head-part forming die 152 and the shaft part 11b have come into contact with one another based on whether the first contact detection signal has been received. Consequently, until the first contact detection signal is received (step S502: NO in FIG. 4), the control computer 5 continues to lower the press head 9b at the first speed and at the first load. On the other hand, when the control computer 5 receives the first contact detection signal (step S503: YES), the control computer 5 sends a speed-change signal to the servo press 9 so as to lower the press head 9b at a second speed, which is slower than the first speed (step S504). In addition, at the same time, the control computer 5 gradually increases the load of the press head 9b from the first load.

Figure 13:
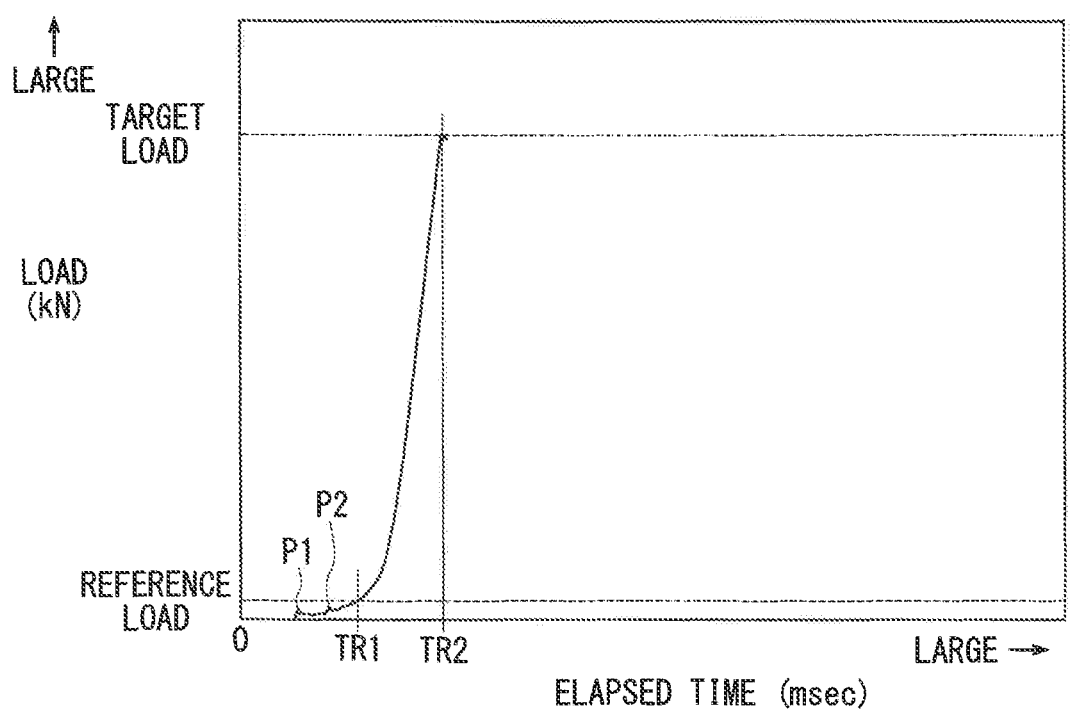
FIG. 13 is a graph that shows, according to the fastening apparatus of working example 1, a load curve calculated by the fastening process.
Figure 14:
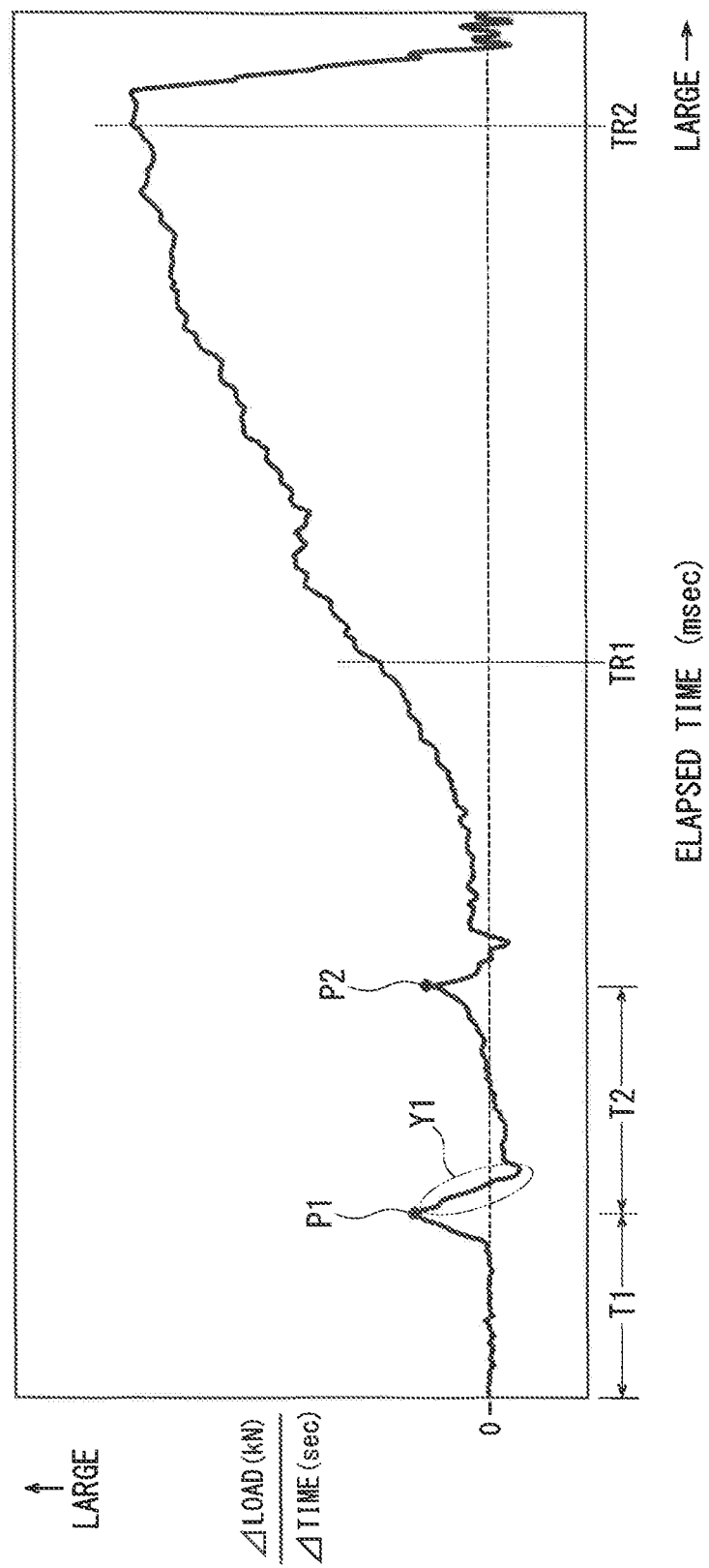
FIG. 14 is a graph that shows, according to the fastening apparatus of working example 1, an adapted load curve for the situation in which the formation of the fastener is satisfactory.
Figure 15:
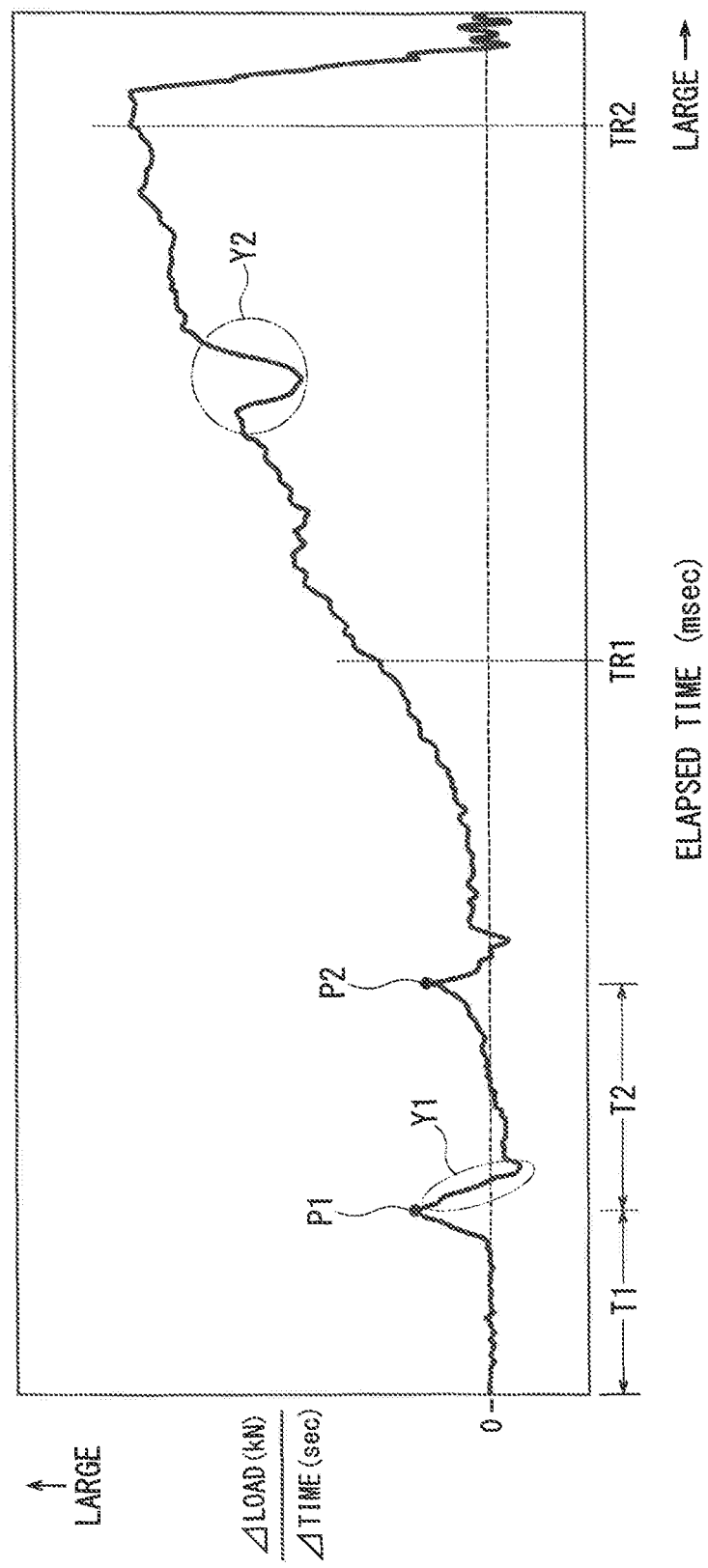
FIG. 15 is a graph that shows, according to the fastening apparatus of working example 1, an adapted load curve for the situation in which the formation of the fastener is a failure (defective).

Upon receiving the speed-change signal, the servo press 9 changes the descent speed of the press head 9b to the second speed (step S505). Thus, there is a slight shift in time from after the head-part forming die 152 coming into contact with the shaft part 11b until the descent speed of the press head 9b is actually changed to the second speed. Then, the press head 9b thereafter descends toward the press position at the second speed. That is, the press head 9b causes the head-part forming die 152 to approach the holding die 151 at the second speed while plastically deforming the other-end (upper) side of the shaft part 11b using the head-part forming die 152. In addition, at this time, the press head 9b increases the load from the first load to a reference load as shown in FIG. 13 and subsequently further increases the load from the reference load to a target load. FIG. 13 shows time TR1, at which the load of the press head 9b exceeds the reference load, and time TR2, at which the load of the press head 9b has increased to the target load. FIG. 14 and FIG. 15, too, show time TR1, at which the load of the press head 9b exceeds the reference load, and time TR2, at which the load of the press head 9b has increased to the target load. Here, the press head 9b continues to increase the load until reaching the target load (step S506: NO). On the other hand, when the load has increased to the target load (step S506: YES), the control computer 5 stops increasing the load of the press head 9b.

Then, as shown in FIG. 11, when the press head 9b reaches the press position and the head-part forming die 152 and the holding die 151 come into their closest approach, the head-part forming die 152 and the second workpiece W2 come into contact with one another. In addition, when the servo press 9 detects that the head-part forming die 152 and the second workpiece W2 have come into contact with one another, the servo press 9 sends a second contact detection signal to the control computer 5. That is, the control computer 5 determines whether the press head 9b has reached the press position based on whether the second contact detection signal has been received. Consequently, until the second contact detection signal is received (step S507: NO), the control computer 5 continues to lower the press head 9b at the second speed. On the other hand, when the second contact detection signal is received (step S507: YES), the control computer 5 holds the first assembly A1, using the holding die 151 and the head-part forming die 152, at a prescribed holding pressure (step S508). It is noted that this holding pressure is set in advance by the control program.

Thus, a second head part 11c is formed, by the first cavity C1, on the other-end (upper_side of the shaft part 11b. Thereby, the (two-headed) fastener 11 is obtained from the intermediate piece (one-headed rivet) 110. As mentioned above, because the intermediate piece 110 is made of CFRTP, the fastener 11 is also made of CFRTP. In the fastener 11, the second head part 11c opposes the first head part 11a, and both sandwich the shaft part 11b. In addition, the same as in the first head part 11a, the second head part 11c is formed with a diameter larger than that of the shaft part 11b and larger than that of each of the through holes W10, W20 of the first and second workpieces W1, W2. Thereby, as shown in FIG. 12, the shaft part 11b, which is inserted through the through holes W10, W20, is retained from both sides by the first head part 11a and the second head part 11c. Thus, the first and second workpieces W1, W2 are fastened by the fastener 11.

The holding of the first assembly A1 by the holding die 151 and the head-part forming die 152 continues until a hold time, which is set in advance by the control program, elapses (step S509: NO in FIG. 4). Consequently, in the fastening process, the heat of the shaft part 11b, which was heated in the above-mentioned shaft-part heating process, and, in turn, the heat of the fastener 11 obtained from the intermediate piece 110, is absorbed by the holding die 151 and the head-part forming die 152, which constitute the fastener-forming die 15. Then, when the hold time has elapsed (step S509: YES), the control computer 5 controls the servo press 9 so as to displace (lift) the press head 9b toward the initial position (step S510). In addition, the CPU 53 of the control computer 5 terminates the calculation of the load curve (step S511). The load curve calculated by the CPU 53 has a shape like, for example, the graph shown in FIG. 13. Furthermore, the load curve is temporarily stored in the RAM 52. Thus, the fastening process ends, and the work of fastening the first workpiece W1 and the second workpiece W2 is complete. It is noted that the load curve shown in FIG. 13 is merely one example, and the load curve calculated by the CPU 53 correspondingly changes based on the amount of heating (temperature increase) of the shaft part 11b in the shaft-part heating process, the amount of plastic deformation of the shaft part 11b in the fastening process, and the like.

Next, a pass/fail determining process (i.e. a defect detecting process) is performed using the measured load curve (step S6 in FIG. 2). In the determining process, the control computer 5 determines whether the fastener 11 formed by the above-described fastening process has passed or failed. Specifically, based on the calculating program, the determining program, and the like stored in the ROM 51, the CPU 53 determines whether the fastener 11 has passed or failed in accordance with the control flow shown in FIG. 5.

In the determining process, first, the CPU 53 calculates an adapted load curve based on the load curve that was calculated in the fastening process (step S601). This adapted load curve is calculated by differentiating the load curve, which was calculated in the fastening process, with respect to time (refer to FIG. 14 and FIG. 15). The calculated adapted load curve is temporarily stored in the RAM 52 and displayed on the display 5b (step S602).

Here, the change in the load that acts on the fastener-forming die 15, and, in turn, the intermediate piece 110, via the press head 9b during the fastening process will be explained with reference to the load curve shown in FIG. 13 and the adapted load curves shown in FIG. 14 and FIG. 15. As mentioned above, in the fastening process, the press head 9b starts descending toward the press position with the load of the press head 9b set to the first load. However, until the other-end side of the shaft part 11b comes into contact with the inner-circumferential surface of the second recessed part 152a, the load that acts on the fastener-forming die 15, and, in turn, the intermediate piece 110, is substantially zero. Then, when the other-end (upper) side of the shaft part 11b comes into contact with the inner-circumferential surface of the second recessed part 152a, the load that acts on the intermediate piece 110 temporarily becomes large. Consequently, in the load curve shown in FIG. 13 and the adapted load curves shown in FIG. 14 and FIG. 15, a first peak P1 appears after the application of pressure to the fastener-forming die 15 by the servo press 9.

Because the other-end (upper) side of the shaft part 11b is in the plastically deformable softened state owing to the induction heating, the other-end (upper) side of the shaft part 11b begins to plastically deform and conforms to the shape of the second recessed part 152a when the other-end (upper) side of the shaft part 11b comes into contact with the inner-circumferential surface of the second recessed part 152a. Consequently, after the first peak P1, the load that acts on the intermediate piece 110 decreases, as can be clearly seen in area (circle) Y1 shown in FIG. 14 and FIG. 15. Thereafter, as the load of the press head 9b gradually increases from the first load, the load that acts on the intermediate piece 110 once again also begins to gradually increase. Then, when the descent speed of the press head 9b actually changes from the first speed to the second speed, the load that acts on the intermediate piece 110 temporarily becomes large, and a second peak P2 appears in the load curve, the adapted load curves, and the like.

The load acting on the intermediate piece 110 temporarily decreases after the second peak P2. However, as the load of the press head 9b continues to increase from the first load to the reference load, the load acting on the intermediate piece 110 also increases to the reference load. Furthermore, when the load of the press head 9b exceeds the reference load and increases to the target load, the load acting on the intermediate piece 110 also exceeds the reference load and increases to the target load. After the target load has been reached, because the first assembly A1 is held at a prescribed holding pressure by the holding die 151 and the head-part forming die 152, a load that corresponds to the holding pressure acts on the intermediate piece 110. It is noted that, when the hold time elapses and the press head 9b is then displaced (lifted) toward the initial position, the load that acts on the intermediate piece 110, that is, on the fastener 11, decreases again (refer to FIG. 14 and FIG. 15).

Figure 5:
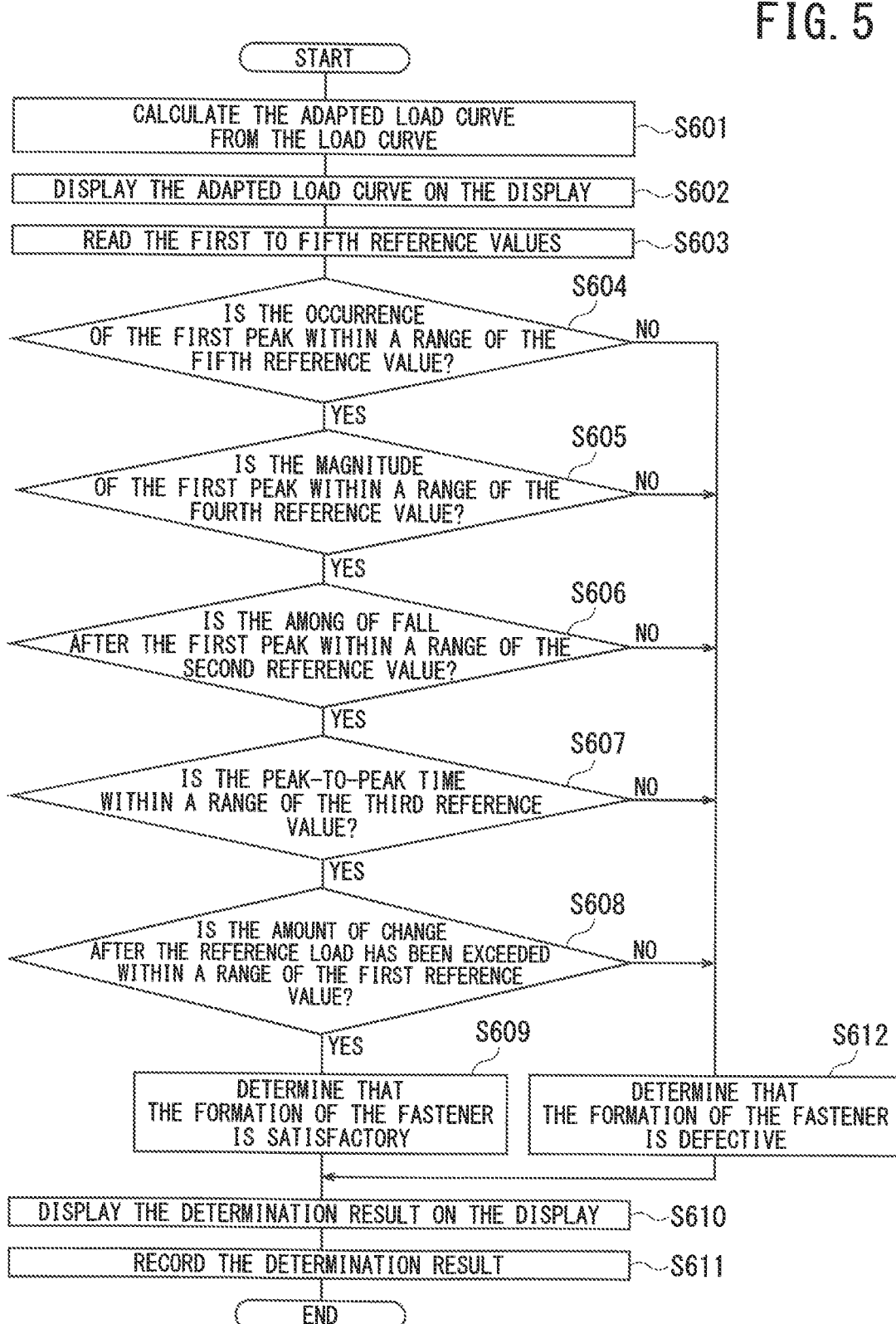
FIG. 5 is a control flow for explaining how a determining process is performed by the fastening apparatus of working example 1.

In addition, the CPU 53 reads the first to fifth reference values stored in the ROM 51 (step S603 shown in FIG. 5). As the first reference value, an amount of change per unit of time in the load curve after the reference load has been exceeded is set. As the second reference value, an amount that the load curve falls after the first peak P1 is set. As the third reference value, a peak-to-peak time from the first peak P1 to the second peak P2 in the load curve is set. As the fourth reference value, a magnitude of the first peak P1 in the load curve is set. As the fifth reference value, a time, from when the application of pressure by the servo press 9 on the fastener-forming die 15 begins until the first peak P1 occurs, in the load curve is set. Here, the first to fifth reference values are determined based on multiple types of load curves for fasteners 11 in which the formation has been determined to be satisfactory. It is noted that the first to fifth reference values may be theoretical values or the like.

Figure 4:
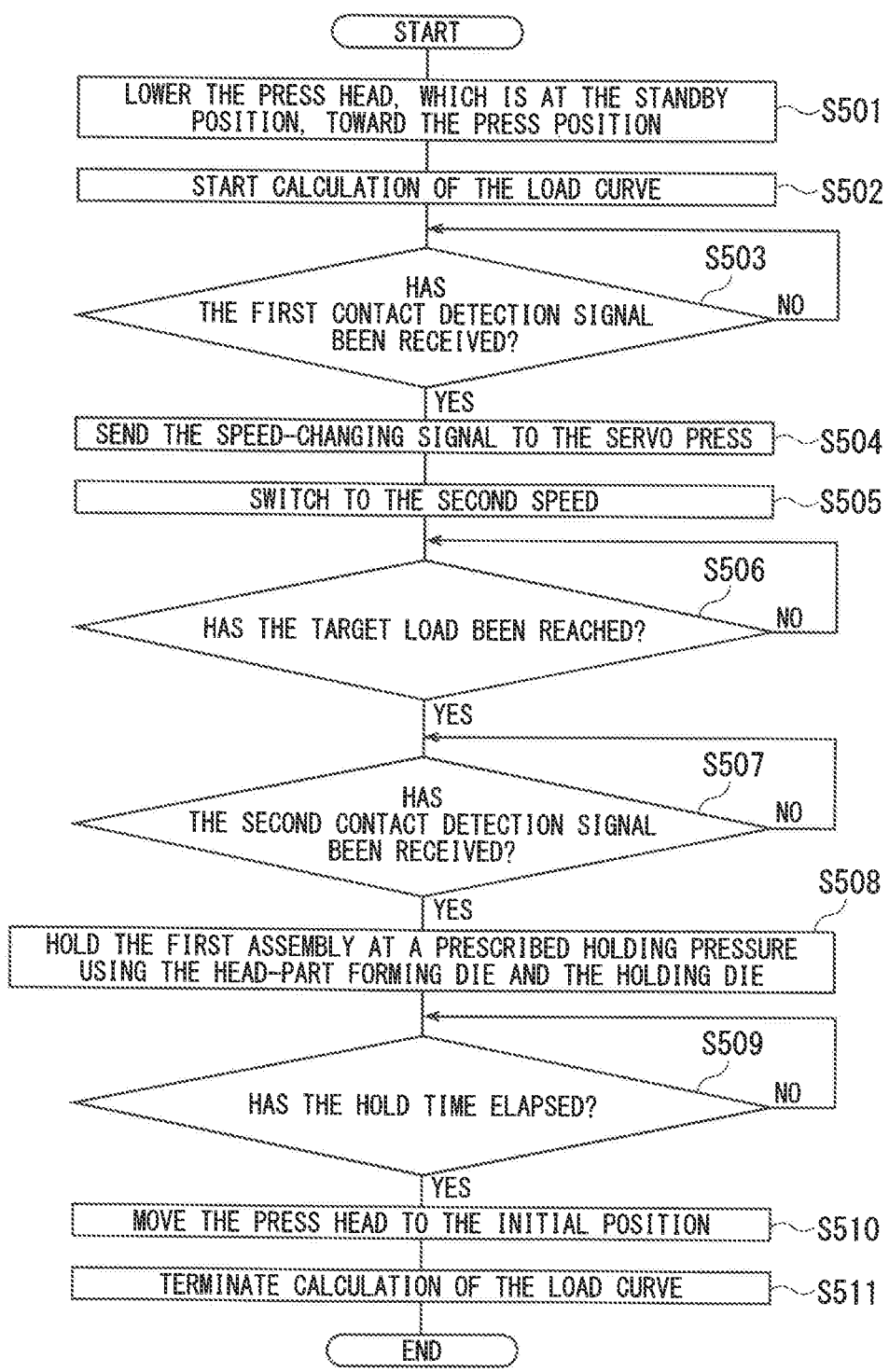
FIG. 4 is a control flow for explaining how a fastening process is performed by the fastening apparatus of working example 1.

Then, the CPU 53 determines whether the real (non-differentiated) load curve, which was calculated between step S501 and step S511 shown in FIG. 4, is within each of the respective ranges of the first to fifth reference values. Specifically, because the CPU 53 in this fastening apparatus calculates the adapted (differentiated) load curve based on the measured load curve, the CPU 53 determines whether the adapted load curve is within the respective ranges of the first to fifth reference values by going through step S604 to step S608 shown in FIG. 5. The situation in which the adapted load curve (of a non-defective fastener 11) shown in FIG. 14 is calculated in step S601 and the situation in which the adapted load curve (of a defective fastener 11) shown in FIG. 15 is calculated are separately explained below.

<Situation in which the Adapted Load Curve Shown in FIG. 14 is Calculated>

First, the CPU 53 determines whether a first time T1, which is the time from when the application of pressure on the fastener-forming die 15 by the servo press 9 starts until the first peak P1 occurs, is within a range of the fifth reference value. Here, if the dimensions of the shaft part 11b of the intermediate piece 110 are within ranges of a standard that is set in advance, then the time from when the application of pressure on the fastener-forming die 15 by the servo press 9 starts until the other-end (upper) side of the shaft part 11b comes into contact with the inner-circumferential surface of the second recessed part 152a is (should be) substantially constant. In this case, in the adapted load curve shown in FIG. 14, the first time T1 is within the range of the fifth reference value, and the occurrence of the first peak P1 is within the range of the fifth reference value (step S604: YES shown in FIG. 5). Conversely, if the dimensions of the shaft part 11b deviate from the standard, then the variation in the time from when the application of pressure on the fastener-forming die 15 by the servo press 9 begins until the other-end (upper) side of the shaft part 11b comes into contact with the inner-circumferential surface of the second recessed part 152a will become large. In addition, if the intermediate piece 110 is held by the holding die 151 in a tilted manner, etc., the variation in the time until the other-end (upper) side of the shaft part 11b comes into contact with the inner-circumferential surface of the second recessed part 152a will become large. For these reasons, the first time T1 becomes longer or becomes shorter than the range of the fifth reference value. In these situations, the CPU 53 determines that the occurrence of the first peak P1 is outside the range of the fifth reference value (step S604: NO). If the CPU 53 determines that the first time T1 is outside the range of the fifth reference value, then the process advances to step S612 without performing the subsequent determinations from step S605 until step S609.

When the CPU 53 has determined, using the adapted load curve shown in FIG. 14, that the occurrence of the first peak P1 is within the range of the fifth reference value (step S604: YES), the CPU 53 next determines whether the magnitude of the first peak P1 in the adapted load curve is within a range of the fourth reference value. When the induction heating of the shaft part 11b is performed suitably and the other-end (upper) side of the shaft part 11b suitably changes to the plastically deformable softened state, the magnitude of the first peak P1 is (should be) substantially constant and within the range of the fourth reference value (step S605: YES). However, there is also the possibility of situations in which, for example: in the induction heating of the shaft part 11b, even though the surface temperature of the shaft part 11b has reached the set temperature, the interior of the shaft part 11b has not been sufficiently heated and has not changed to the plastically deformable softened state; the induction heating of the shaft part 11b was not suitably performed because in the interval after reaching the set temperature until the set time elapsed, the other-end side of the shaft part 11b softened excessively; and the like. In such situations, because the variation in the magnitude of the first peak P1 in the adapted load curve becomes large, the CPU 53 determines that the magnitude of the first peak P1 is outside the range of the fourth reference value (step S605: NO). If the CPU 53 has determined that the magnitude of the first peak P1 is outside the range of the fourth reference value, then the process advances to step S612 without performing the subsequent determinations from step S606 to step S609.

When the CPU 53 has determined, using the adapted load curve shown in FIG. 14, that the magnitude of the first peak P1 is within the range of the fourth reference value (step S605: YES), the CPU 53 next determines whether the amount that the adapted load curve falls after the first peak P1 is within a range of the second reference value. Specifically, the CPU 53 determines whether the amount of the fall in area Y1 is within the range of the second reference value. Here, if the other-end (upper) side of the shaft part 11b is suitably in the plastically deformable softened state, then plastic deformation of the other-end side of the shaft part 11b suitably starts. Consequently, the amount of the fall after the first peak P1 is (should be) substantially constant and within the range of the second reference value (step S606: YES). However, as mentioned above, if the induction heating of the shaft part 11b was not suitably performed, plastic deformation of the other-end side of the shaft part 11b does not suitably start, and the variation in the amount that the adapted load curve falls after the first peak P1, that is, the amount of the fall in area Y1, becomes large. In this case, the CPU 53 determines that the amount of the fall after the first peak P1 is outside the range of the second reference value (step S606: NO). If the CPU 53 has determined that the amount that the adapted load curve falls after the first peak P1 is outside the range of the second reference value, then the process advances to step S612 without performing the subsequent determinations from step S607 to step S609.

When the CPU 53 has determined, using the adapted load curve shown in FIG. 14, that the amount of the fall after the first peak P1 is within the range of the second reference value (step S606: YES), the CPU 53 next determines whether a second time T2, which is the peak-to-peak time from the first peak P1 to the second peak P2 in the adapted load curve, is within a range of the third reference value. Here, if the other-end (upper) side of the shaft part 11b is suitably in the plastically deformable softened state and plastic deformation of the other-end side of the shaft part 11b is suitably performed, then the length of the second time T2 is (should be) substantially constant and within the range of the third reference value (step S607: YES). However, if the other-end side of the shaft part 11b is not in the plastically deformable softened state and the other-end side of the shaft part 11b has excessively softened, or the like, then the plastic deformation of the other-end side of the shaft part 11b is not suitably performed. In these cases, the second time T2 may become longer or shorter than the range of the third reference value. In these situations, the CPU 53 determines that the peak-to-peak time, that is, the second time T2, is outside the range of the third reference value (step S607: NO). If the CPU 53 has determined that the second time T2 is outside the range of the third reference value, then the process advances to step S612 without performing the subsequent determinations of step S608 and step S609.

When the CPU 53 has determined, using the adapted load curve shown in FIG. 14, that the second time T2 is within the range of the third reference value (step S607: YES), the CPU 53 next determines whether the amount of change per unit of time in the load curve after the reference load has been exceeded is within a range of the first reference value. If the plastic deformation of the other-end side of the shaft part 11b is suitably performed, then, by virtue of the load of the press head 9b exceeding the reference load and increasing to the target load, even though there is some variation in the load, the load that acts on the intermediate piece 110 increases from the reference load to the target load with a comparatively gentle slope. Consequently, because the load that acts on the intermediate piece 110 increases gently from the reference load to the target load in the adapted load curve, too, the amount of change per unit of time in the adapted load curve after the reference load has been exceeded is within the range of the first reference value. In this case, using the adapted load curve shown in FIG. 14, the CPU 53 has determined that the amount of change per unit of time in the adapted load curve after the reference load has been exceeded is within the range of the first reference value (step S608: YES shown in FIG. 5).

That is, using the adapted load curve shown in FIG. 14, the CPU 53 has determined that every one of the items mentioned above is within the respective ranges of the first to fifth reference values. Consequently, the control computer 5 determines that the formation of the fastener 11 in the above-mentioned fastening process is satisfactory (step S609). In addition, the control computer 5 reports the determination result to the operator by displaying the determination result on the display 5b (step S610). Furthermore, the control computer 5 records, in the storage 54, the above-mentioned determination result and the load curve that constitutes the basis of the adapted load curve shown in FIG. 14 (step S611). Then, the determining process ends.

<Situation in which the Adapted Load Curve Shown in FIG. 15 is Calculated>

In the situation shown in FIG. 15, please assume that the CPU 53 has determined that every one of the first to fourth reference values is within their respective ranges (step S603-S607: YES). However, in the adapted load curve shown in FIG. 15, the load has markedly decreased in area Y2. Such a decrease of the load is conceivably caused by the occurrence of buckling, a crack, or the like in the shaft part 11b at the time when the load of the press head 9b exceeds the reference load and increases to the target load. Accordingly, in such a situation, the CPU 53 determines that the amount of change per unit of time in the load curve after the reference load has been exceeded is outside the range of the first reference value (step S608: NO).

Consequently, the control computer 5 determines that the formation of the fastener 11 in the above-mentioned fastening process is defective (step S612). It is noted that, in any situation in which the CPU 53 determines that a measured (actual) value is outside the corresponding range of any one of the first to fourth reference values, the control computer 5 also determines that the formation of the fastener 11 is defective.

Then, when it has been determined that the formation of the fastener 11 is defective, the control computer 5 reports the determination result to the operator by displaying the determination result on the display 5b (step S610). Furthermore, the control computer 5 records, in the storage 54, the above-mentioned determination result and the load curve that constitutes the basis of the adapted load curve shown in FIG. 15 (step S611). Thus, in this situation, too, the determining process ends.

After the determining process has ended, the first and second workpieces W1, W2 fastened by the fastener 11 are removed from the fastener-forming die 15 (step S7 shown in FIG. 2) by the third work arm 103. Thus, the work of fastening the first workpiece W1 and the second workpiece W2 is complete. Then, the operator processes, as a nondefective (satisfactorily formed) fastened object, the fastened object of the first workpiece W1 and the second workpiece W2, which were fastened by the fastener 11 whose formation was determined to be satisfactory. On the other hand, the operator processes, as a fastened object resulting from imperfect fastening work (defective fastener) and separately from nondefective fastened objects, the fastened object of the first workpiece W1 and the second workpiece W2 fastened by the fastener 11 whose formation was determined to be defective.

Thus, with this fastening apparatus, the shaft part 11b is heated by the first high-frequency induction coil 3b. Consequently, in the shaft-part heating process, the other-end side of the shaft part 11b can be directly and locally heated in a non-contacting manner by induction heating using the first high-frequency induction coil 3b. Owing to the non-contacting heating, the softened resin tends not to adhere to the heat source. Consequently, with this fastening apparatus, when the shaft part 11b is being heated, there is no need to heat the fastener-forming die 15. Thereby, compared with the intermediate piece 110 having the heated shaft part 11b, the temperature of the fastener-forming die 15 is low. Consequently, when the fastener 11 is being formed from the intermediate piece 110, the heat of the intermediate piece 110 can be absorbed by the fastener-forming die 15. As a result, by using this fastening apparatus, the formed fastener 11 can be cooled quickly compared with the situation in which the fastener 11 is formed by heating the fastener-forming die 15.

In addition, with this fastening apparatus, because the pass/fail of the formation of the fastener 11 can be determined by the control computer 5, it is easy to discover a defectively formed fastener 11. In addition, with this fastening apparatus, even if imperfect work occurs in the fastening of the first workpiece W1 and the second workpiece W2 owing to a defectively formed fastener 11, the discovery thereof is easy.

Thus, according to the fastening apparatus of working example 1, the work of fastening the first workpiece W1 and the second workpiece W2 by the fastener 11 made of a fiber-reinforced resin can be performed rapidly, and the quality of the work of fastening the first workpiece W1 and the second workpiece W2 can be increased.

In particular, in this fastening apparatus, the servo press 9 causes the head-part forming die 152 to approach the holding die 151 at the first speed until the other-end side of the shaft part 11b comes into contact with the inner-circumferential surface of the second recessed part 152a of the head-part forming die 152. Then, when the other-end side of the shaft part 11b comes into contact with the inner-circumferential surface of the second recessed part 152a, the servo press 9 causes the head-part forming die 152 to approach the holding die 151 at the second speed. Consequently, until the other-end side of the shaft part 11b comes into contact with the inner-circumferential surface of the second recessed part 152a, the servo press 9 moves the head-part forming die 152 quickly toward the holding die 151; in contrast, after the other-end side of the shaft part 11b has come into contact with the inner-circumferential surface of the second recessed part 152a, the servo press 9 can carefully apply pressure to the fastener-forming die 15. Thereby, with this fastening apparatus, the fastener 11 can be formed suitably while the work of fastening the first workpiece W1 and the second workpiece W2 is performed rapidly.

In addition, with this fastening apparatus, the determination of the pass/fail of the fastener 11 is performed while displaying on the display 5b the adapted load curve calculated by the CPU 53 based on the load curve. Furthermore, the result of the pass/fail determination of the fastener 11 is also displayed on the display 5b. Consequently, when the formation of the fastener 11 has been determined to be defective, the operator can easily discover the cause of the defective formation of the fastener 11 by referring to the adapted load curve displayed on the display 5b.

Furthermore, a fastened object of the first workpiece W1 and the second workpiece W2 fastened by the fastener 11 whose formation was determined to be defective is processed, separately from nondefective fastened objects, as a fastened object produced by imperfect fastening work. Consequently, it is possible to prevent the comingling of fastened objects produced by imperfect fastening work with nondefective fastened objects.

In addition, with this fastening apparatus, because the result of the pass/fail determination of the fastener 11 as well as the load curve are recorded in the storage 54, the quality control of the fastener 11, and, in turn, the quality control of the work of fastening the first workpiece W1 and the second workpiece W2, can be suitably performed.

Furthermore, as shown in FIG. 6, each carbon fiber CF extends in the intermediate piece 110 from the first head part 11a to the end part on the other-end side of the shaft part 11b. Consequently, after undergoing the fastening process, each carbon fiber CF in the fastener 11 extends from the first head part 11a to the second head part 11c via the shaft part 11b, as shown in FIG. 12, such that the first and second head parts 11a, 11c and the shaft part 11b can be suitably reinforced by the carbon fibers CF. Consequently, for example, even if a large load acts on the first workpiece W1, the second workpiece W2, or the like, the first and second head parts 11a, 11c tend not to be deformed by the first workpiece W1, the second workpiece W2, or the like, and the fastening of the first workpiece W1 and the second workpiece W2 tends not to be released (broken). Thereby, by using this fastening apparatus, the first workpiece W1 and the second workpiece W2 can be securely fastened by the fastener 11, which is made of CFRTP.

Working Example 2

In the fastening apparatus of working example 2, the high-frequency induction heater 3 comprises a second high-frequency induction coil 3d, which is shown in FIG. 18, instead of the first high-frequency induction coil 3b. The second high-frequency induction coil 3d is also one example of a "high-frequency induction coil" in the present teachings. A first tip part 32 and a second tip part 33 are formed on (in) the second high-frequency induction coil 3d. The first tip part 32 has a shape the same as that of the first tip part 31 in working example 1. The shapes of the second tip part 33 and the first tip part 32 are symmetric. That is, a first recessed part 32a is formed in the first tip part 32, and a second recessed part 33a is formed in the second tip part 33. The first recessed part 32a and the second recessed part 33a are capable of enveloping (configured to partially surround) the shaft body 111, which is discussed below. The first tip part 32 and the second tip part 33 are provided spaced apart and capable of receiving the first workpiece W1 and the second workpiece W2 therebetween. Furthermore, the first tip part 32 and the second tip part 33 are disposed lined up in the axial direction of the shaft body 111 and, in turn, in the axial direction of the fastener 11. In addition, in this fastening apparatus, the energization controller 3c (refer to FIG. 1) is capable of supplying electric power to the second high-frequency induction coil 3d. Furthermore, the temperature sensor detects the surface temperature of the shaft body 111. Other structural elements in this fastening apparatus are the same as those in the fastening apparatus of working example 1, identical structural elements are assigned the same symbols, and detailed description related thereto is omitted.

Figure 16:
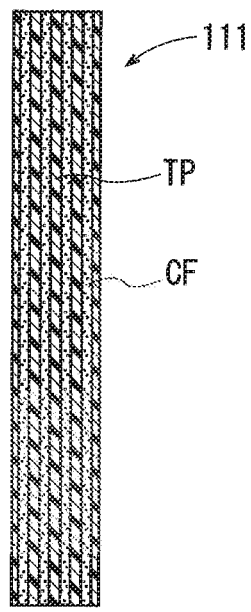
FIG. 16 is a cross-sectional view that shows a shaft body.

With this fastening apparatus according to working example 2, the work of fastening the first workpiece W1 and the second workpiece W2 using the fastener 11 is performed according to the fastening method described below. First, as the preparing process, the first workpiece W1 and the second workpiece W2 are prepared, and the shaft body 111 shown in FIG. 16 is prepared. The same as with the intermediate piece 110 mentioned above, the shaft body 111 is also composed of a thermoplastic resin TP, such as nylon, and a plurality of carbon fibers CF. That is, the shaft body 111 is also made of CFRTP. The shaft body 111 has a circular-columnar shape extending in an axial direction. The dimensions of the shaft body 111 are defined in accordance with the shapes of the first and second workpieces W1, W2 to be fastened. In addition, each carbon fiber CF extends from one-end side to the other-end side of the shaft body 111 in an axial direction. It is noted that, in FIG. 16, to facilitate the explanation, the number of the carbon fibers CF is simplified and the shapes of the carbon fibers CF are shown in an exaggerated manner.

Next, the same as in the fastening apparatus of working example 1, the operator inputs necessary work data via the keyboard 5c. Then, the operator sends, using the control computer 5, a control signal to the first and second work arms 101, 102 to start control of the first and second work arms 101, 102. At this time, the first work arm 101 rotates the press unit 1 clockwise by 90° from the state shown in FIG. 1 and holds the press unit 1. That is, in the press unit 1, the servo press 9 is brought into a horizontal state in the left-right direction. In addition, the second work arm 102 positions the high-frequency induction heater 3 upward of the press unit 1 while holding the high-frequency induction heater 3.

Figure 17:
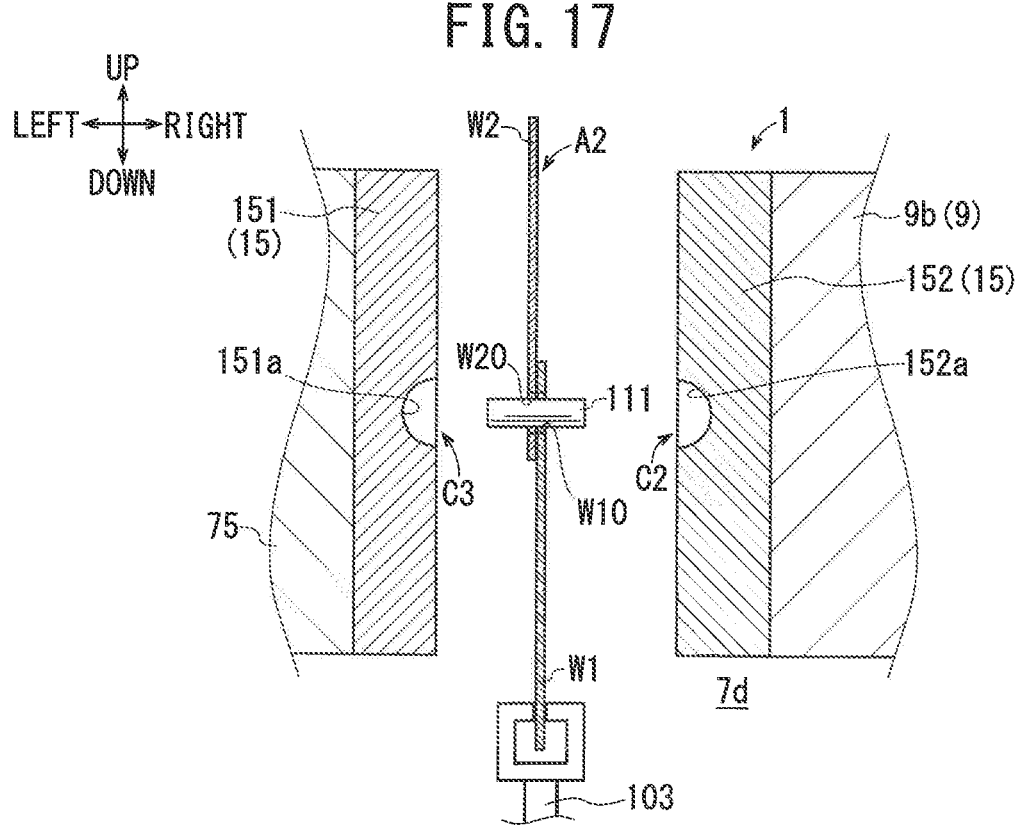
FIG. 17 is a principal-parts enlarged cross-sectional view that shows, according to the fastening apparatus of working example 2, the state in which the shaft body is inserted through the through hole of each workpiece.

Next, the same as with the fastening apparatus of working example 1, the operator mounts the fastener-forming die 15 on the press unit 1 (refer to FIG. 17). Thereby, in this fastening apparatus, a second cavity C2 is formed between the second recessed part 152a of the head-part forming die 152 and the first workpiece W1. In addition, a third cavity C3 is formed between the first recessed part 151a of the holding die 151 and the second workpiece W2.

Next, the operator controls the third work arm 103 using the control computer 5 so as to cause the shaft body 111 to be inserted through the through hole W10 of the first workpiece W1 and the through hole W20 of the second workpiece W2. Thereby, the first workpiece W1, the second workpiece W2, and the shaft body 111 constitute a second assembly A2. Next, the third work arm 103, while holding the first workpiece W1, disposes the second assembly A2 between the head-part forming die 152 and the holding die 151 within the work space 7d. At this time, the third work arm 103 disposes the second assembly A2 between the head-part forming die 152 and the holding die 151 in the state in which the shaft body 111 in the second assembly A2 is orthogonal to the up-down direction, that is, in the state in which the opposite ends of the shaft body 111 respectively oppose the first recessed part 151a and the second recessed part 152a. It is noted that, in FIG. 17 to FIG. 20, too, although the shapes of the through holes W10, W20 are shown exaggerated to facilitate the explanation, the shaft body 111, and, in turn, the shaft part 11b, is formed with substantially the same diameter as that of each of the through holes W10, W20. Consequently, when the second assembly A2 has been disposed between the head-part forming die 152 and the holding die 151, the shaft body 111 is prevented, with high reliability, from falling out of the through holes W10, W20.

Next, the control computer 5 displaces the press head 9b from the initial position to the standby position by controlling the servo press 9. Then, the shaft-body heating process is performed. In the shaft-body heating process, the shaft body 111 is heated in the noncontacting state while the shaft body 111 is inserted through each of the through holes W10, W20 of the first and second workpieces W1, W2. First, the control computer 5 sends a control signal to the second work arm 102 so as to lower the high-frequency induction heater 3 and, as shown in FIG. 18, move the second high-frequency induction coil 3d to the heating position. Thereby, with regard to the second high-frequency induction coil 3d, one-end side (a first end portion) of the shaft body 111 is received within the first recessed part 32a, which is formed in the first tip part 32, and the other-end side (a second end portion) of the shaft body 111 is received within the second recessed part 33a, which is formed in the second tip part 33. It is noted that, in this embodiment, too, the second high-frequency induction coil 3d and the shaft body 111 do not contact one another.

Thereafter, when the control computer 5 sends a control signal to the energization controller 3c and then the energization controller 3c starts the supply of electrical current to the second high-frequency induction coil 3d, induction heating of the shaft body 111 by the second high-frequency induction coil 3d is started. Thus, the one-end side (first end portion) and the other-end side (second end portion) of the shaft body 111 are simultaneously heated by the second high-frequency induction coil 3d. Consequently, the opposite ends of the shaft body 111 are both simultaneously brought into a plastically deformable softened state by the generation of heat. Then, the same as in the fastening apparatus of working example 1, when the set time since the temperature of the one-end side and the other-end side of the shaft body 111 reached the set temperature has elapsed, induction heating of the shaft body 111 ends. Thereafter, the second work arm 102 moves the second high-frequency induction coil 3d to the retracted position. Thus, the shaft-body heating process ends.

Next, the fastening process is performed. In the fastening process, the same as with the fastening apparatus of working example 1, the control computer 5 controls the servo press 9 so as to move the press head 9b, which is at the standby position, to the press position, as indicated by the white arrow in FIG. 19. In this situation, too, the control computer 5 first causes the head-part forming die 152 to approach the holding die 151 at the first speed. In addition, the control computer 5 sets the load of the press head 9b to the first load. Thus, the servo press 9 starts the application of pressure to the fastener-forming die 15 using the first load. Furthermore, the same as in the fastening apparatus of working example 1, the CPU 53 of the control computer 5 starts the calculation of the load curve. Here, with this fastening apparatus, as indicated by the black arrow in the same drawing, the third work arm 103 causes the second assembly A2 to gradually approach the holding die 151 in accordance with the movement of the press head 9b to the press position.

Thus, the one-end side (first end portion) of the shaft body 111 advances into the second recessed part 152a of the head-part forming die 152, and the other-end side (second end portion) of the shaft body 111 advances into the first recessed part 151a of the holding die 151. Then, simultaneous with the head-part forming die 152 coming into contact with the one-end side of the shaft body 111, the holding die 151 comes into contact with the other-end side of the shaft body 111. Thereby, the servo press 9 detects that the head-part forming die 152 has come into contact with the shaft body 111 and therefore sends the first contact detection signal to the control computer 5, the same as in the fastening apparatus of working example 1. Then, when the control computer 5 receives the first contact detection signal, the control computer 5 sends, to the servo press 9, the speed-change signal to change from the first speed to the second speed, the same as with the fastening apparatus of working example 1. In addition, at the same time, the control computer 5 gradually increases the load of the press head 9b from the first load.

Thereby, the press head 9b further moves toward the press position while plastically deforming the one-end side of the shaft body 111 using the head-part forming die 152. In addition, the other-end side of the shaft body 111 is also likewise plastically deformed by the holding die 151. Then, as shown in FIG. 20, when the press head 9b of this fastening apparatus reaches the press position, the first workpiece W1 and the head-part forming die 152 come into contact with one another, and the second workpiece W2 and the holding die 151 come into contact with one another. In addition, when the servo press 9 detects that the first workpiece W1 and the head-part forming die 152 have come into contact, the servo press 9 sends a third contact detection signal to the control computer 5. When the control computer 5 receives the third contact detection signal, the control computer 5 controls the servo press 9 so as to hold the second assembly A2, by the holding die 151 and the head-part forming die 152, at the prescribed holding pressure until the prescribed hold time elapses. It is noted that the holding pressure and the hold time at this time are the same as in the fastening apparatus of working example 1.

Thus, the first head part 11a is formed by the second cavity C2 on the one-end side of the shaft body 111, and the second head part 11c is formed by the third cavity C3 on the other-end side of the shaft body 111. In addition, the shaft part 11b is formed between the first head part 11a and the second head part 11c. Thus, with this fastening apparatus, the fastener 11, which is made of CFRTP, is obtained from the shaft body 111, which is made of CFRTP. In addition, the same as with the fastening apparatus of working example 1, the heat of the fastener 11 is absorbed by the holding die 151 and by the head-part forming die 152, which constitute the fastener-forming die 15. Thereby, the first and second workpieces W1, W2 are fastened by the fastener 11, which is made of CFRTP. Furthermore, the CPU 53 of the control computer 5 terminates the calculation of the load curve. Thus, the fastening process ends, and the work of fastening the first workpiece W1 and the second workpiece W2 is complete.

Furthermore, the same as with the fastening apparatus of working example 1, in this fastening apparatus, too, the control computer 5 determines whether the fastener 11, which was formed by the above-mentioned fastening process, has passed or failed in accordance with the control flow shown in FIG. 5.

Thus, with this fastening apparatus, the fastener 11 is formed directly from the shaft body 111, without using the intermediate piece 110, by simultaneously forming the first head part 11a, the second head part 11c, and the shaft part 11b from the shaft body 111. Consequently, with this fastening apparatus, compared with the fastening apparatus of working example 1, the work of fastening the first workpiece W1 and the second workpiece W2 can be performed more rapidly. In addition, as shown in FIG. 16, each carbon fiber CF in the shaft body 111 extends from the one-end side to the other-end side in the axial direction. Consequently, likewise, in this fastener 11, which is obtained from the shaft body 111, each carbon fiber CF extends from the first head part 11a to the second head part 11c via the shaft part 11b. Consequently, with this fastener 11, too, the first and second head parts 11a, 11c and the shaft part 11b can be suitably reinforced by the carbon fibers CF. Other functions in this fastening apparatus are the same as those in the fastening apparatus of working example 1.

The above explained the present teachings in accordance with working examples 1, 2, but the present invention is not limited to the above-mentioned working examples 1, 2, and it is understood that appropriate modifications can be applied within a scope that does not depart from the gist thereof.

Modified Example

A configuration that uses an infrared heater, instead of the first high-frequency induction coil 3b according to working example 1 or the second high-frequency induction coil 3d according to working example 2, to heat the shaft part or the shaft body in a non-contacting state is included in the present teachings. In this modified example, the infrared heater comprises: a glass tube; a heater electric line, which is provided and disposed in the interior thereof; and a reflective surface, which is provided on part of a wall surface of the glass tube or on an outer part of the glass tube. The shape of the infrared heater may be the same as the first high-frequency induction coil 3b shown in FIG. 8 and FIG. 9 or the same as the second high-frequency induction coil 3d shown in FIG. 18, or may be any shape as long as the shaft part or the shaft body can be heated in a non-contacting state. Furthermore, in this modified example, the same as with the fastening apparatuses of working examples 1, 2, the control computer 5 determines whether the fastener 11, which is formed by the above-mentioned fastening process, has passed or failed according to the control flow shown in FIG. 5. Accordingly, in this modified example, too, the work of fastening the first workpiece W1 and the second workpiece W2 using the fastener 11 made of a fiber-reinforced resin can be performed rapidly, and the quality of the work of fastening the first workpiece W1 and the second workpiece W2 can be increased.

For example, with the fastening apparatus of working example 1, when the first to fifth reference values are all within their respective ranges, the formation of the fastener 11 is determined to be satisfactory. However, not being limited thereto, the formation of the fastener 11 may be determined to be satisfactory when any one of the first to fifth reference values is within its range, when two or more among the first to fifth reference values are within their respective ranges, or the like. The same applies likewise to the fastening apparatus of working example 2.

In addition, in the fastening apparatus of working example 1, a reference value or reference values other than the first to fifth reference values may be provided, and the determination whether the fastener 11 has passed or failed may be performed based on this reference value or these reference values. The same applies likewise to the fastening apparatus of working example 2.

Furthermore, with the fastening apparatus of working example 1, the determination whether the fastener 11 has passed or failed is performed while displaying the adapted load curve on the display 5b, and the result of the determination of the pass/fail of the fastener 11 is displayed on the display 5b. However, not being limited thereto, the adapted load curve, the result of the determination of the pass/fail of the fastener 11, and the like may be displayed on the display 5b only when the operator performs an operation. The same applies likewise to the fastening apparatus of working example 2.

In addition, with the fastening apparatus of working example 1, when performing the pass/fail determination of the fastener 11, the adapted load curve is calculated from the load curve, which was calculated by the fastening process. However, not being limited thereto, the pass/fail determination of the fastener 11 may be performed based on the load curve, which was calculated in the fastening process, without calculating the adapted load curve. The same applies likewise to the fastening apparatus of working example 2.

Furthermore, in the fastening apparatus of working example 1, regardless of whether the temperature of the other-end side of the shaft part 11b has reached the set temperature, the induction heating of the shaft part 11b may be ended based upon just (solely) the elapsing of the set time. The same applies likewise to the induction heating of the shaft body 111 in the fastening apparatus of working example 2.

In addition, in the fastening apparatus of working example 2, the high-frequency induction heater 3 may comprise: a high-frequency induction coil that inductively heats only the one-end side of the shaft body 111; and a (i.e. a different or separate) high-frequency induction coil that inductively heats only the other-end side of the shaft body 111.

In addition, in the fastening apparatus of working examples 1, 2, the fastener-forming die 15 may be configured such that it can be cooled by a coolant.

Furthermore, the intermediate piece 110 and the shaft body 111, and, in turn, the fastener 11, may contain a plurality of intersecting carbon fibers CF.

In addition, although the intermediate piece 110 according to working example 1 and the shaft body 111 according to working example 2 are made of a carbon-fiber-reinforced thermoplastic resin (CFRTP), they are not limited to this composition. For example, the intermediate piece may be made of a thermoplastic resin (polymer) that is reinforced with fibers that differ from carbon fibers, such as, for example, glass fibers, and may be made of a thermoplastic resin (polymer) that is reinforced by multiple types of fibers, including those fibers and carbon fibers. The same applies likewise to the shaft body.

INDUSTRIAL FIELD OF APPLICATION

The present teachings can be used in a vehicle assembly apparatus, or the like.

EXPLANATION OF THE REFERENCE NUMBERS

1 Press unit (fastening device)
3 High-frequency induction heater (fastening device)
3b First high-frequency induction coil (high-frequency induction coil)
3d Second high-frequency induction coil (high-frequency induction coil)
5 Control computer (determining device)
9 Servo press (shaft-part pressure-applying device, shaft-body pressure-applying device)
11 Fastener (two-headed rivet)
11a First head part
11b Shaft part
11c Second head part
15 Fastener-forming die
54 Storage (recording device)
110 Intermediate piece (rivet)
111 Shaft body
151 Holding die (second die)
152 Head-part forming die (first die)
P1 First peak
P2 Second peak
W1 First workpiece (workpiece)
W2 Second workpiece (workpiece)

The invention claimed is:

1. A fastening apparatus for fastening a plurality of workpieces, each having a through hole formed therein, using a fastener formed from an intermediate piece made of a carbon-fiber-reinforced thermoplastic polymer and comprising a shaft part that is integral with a first head part and extends in an axial direction, the fastening apparatus comprising:
   a fastening device configured to heat the shaft part in a non-contacting state while the shaft part is disposed within the through holes of the workpieces and then apply pressure while the shaft part remains disposed within the through holes of the workpieces to form a second head part on the intermediate piece integrally with the shaft part and on an axial end of the shaft part that is opposite of the first head part, and thereby form the fastener that fastens the workpieces; and
   a central processing unit and memory configured to determine whether the fastener is defective or not defective;
   wherein:
   the fastening device comprises:
      a high-frequency induction coil configured to inductively heat the shaft part by generating eddy currents in carbon fibers in the shaft part without the high-frequency induction coil contacting the shaft part;
      a fastening die configured to form the second head part from the heated shaft part; and
      a press configured to apply the pressure to the fastening die; and
   the central processing unit and memory are configured to:
      calculate a load curve defined by the time and the load during which the pressure is applied, and determine whether an amount of change per unit of time in the load curve after a reference load has been exceeded is within a range of a pre-determined first reference value.

2. The fastening apparatus according to claim 1, wherein:
the fastening die comprises a first die and a second die opposing the first die; and
the press is configured to:
move the first die toward the second die at a first speed until the first die comes into contact with the shaft part, and
when the first die comes into contact with the shaft part, move the first die toward the second die at a second speed, which is slower than the first speed.

3. The fastening apparatus according to claim 1, wherein the central processing unit and memory are configured to:
calculate an adapted load curve by differentiating the load curve with respect to time, and
determine whether the fastener is defective or not defective by using the adapted load curve together with the load curve.

4. The fastening apparatus according to claim 1, wherein the central processing unit and memory are configured to determine whether the amount that the load curve falls after a first peak, which appears after the application of the pressure, is within a range of a pre-determined second reference value.

5. The fastening apparatus according to claim 4, wherein the central processing unit and memory are configured to determine whether a peak-to-peak time between the first peak and a second peak in the load curve is within a range of a pre-determined third reference value.

6. The fastening apparatus according to claim 1, further comprising a recording device that records a determination result of the central processing unit.

7. The fastening apparatus according to claim 1, wherein:
the fastening die comprises a first die and a second die opposing the first die;
the press is configured to:
move the first die toward the second die at a first speed until the first die comes into contact with the shaft part, and
when the first die comes into contact with the shaft part, move the first die toward the second die at a second speed, which is slower than the first speed;
the central processing unit and memory are configured to:
calculate an adapted load curve by differentiating the load curve with respect to time,
determine whether the fastener is defective or not defective by using the adapted load curve together with the load curve,
determine whether the amount that the load curve falls after a first peak, which appears after the application of the pressure, is within a range of a pre-determined second reference value, and
determine whether a peak-to-peak time between the first peak and a second peak in the load curve is within a range of a pre-determined third reference value; and
the fastening apparatus further comprises a recording device that records a determination result of the central processing unit.

8. A fastening apparatus for fastening a plurality of workpieces, each having a through hole formed therein, using a fastener formed from one of: a shaft body made of a carbon-fiber-reinforced thermoplastic polymer and extending in an axial direction or an intermediate piece made of the carbon-fiber-reinforced thermoplastic polymer and comprising a shaft part that is integral with a first head part and extends in the axial direction, the fastening apparatus comprising:
a fastening device configured to heat the shaft body or the shaft part in a non-contacting state while the shaft body or the shaft part is disposed within the through holes of the workpieces and then apply pressure while the shaft body or the shaft part remains disposed within the through holes of the workpieces to either: form the shaft body into a first head part, a shaft part formed integrally with the first head part and extending in the axial direction, and a second head part formed on an axial end of the shaft part that is opposite of the first head part, or form a second head part on the intermediate piece integrally with the shaft part and on an axial end of the shaft part that is opposite of the first head part, and thereby form the fastener that fastens the workpieces; and
a central processing unit and memory configured to determine whether the fastener is defective or not defective;
wherein:
the fastening device comprises:
a high-frequency induction coil configured to inductively heat the shaft body or the shaft part by generating eddy currents in carbon fibers in the shaft part or shaft body without the high-frequency induction coil contacting the shaft body or the shaft part;
a fastening die configured to form the fastener from the heated shaft body or the heated shaft part; and
a press configured to apply the pressure to the fastening die; and
the central processing unit and memory are configured to:
calculate a load curve defined by the time and the load during which the pressure is applied, and
determine whether an amount of change per unit of time in the load curve after a reference load has been exceeded is within the range of a first reference value.

9. The fastening apparatus according to claim 8, wherein:
the fastening die comprises a first die and a second die opposing the first die; and
the press is configured to:
move the first die toward the second die at a first speed until the first die comes into contact with the shaft body, and
when the first die comes into contact with the shaft body, move the first die toward the second die at a second speed, which is slower than the first speed.

10. The fastening apparatus according to claim 8, wherein the central processing unit and memory are configured to:
calculate an adapted load curve by differentiating the load curve with respect to time, and
determine whether the fastener is defective or not defective by using the adapted load curve together with the load curve.

11. The fastening apparatus according to claim 8, wherein the central processing unit and memory are configured to determine whether the amount that the load curve falls after a first peak, which appears after the application of the pressure, is within a range of a pre-determined second reference value.

12. The fastening apparatus according to claim 11, wherein the central processing unit and memory are configured to determine whether a peak-to-peak time between the first peak and a second peak in the load curve is within a range of a pre-determined third reference value.

13. The fastening apparatus according to claim 8, further comprising a recording device that records a determination result of the central processing unit.

14. A fastening apparatus for fastening a plurality of workpieces, each having a through hole formed therein, using a fastener formed from one of: a shaft body made of a fiber-reinforced thermoplastic polymer and extending in an axial direction or an intermediate piece made of the fiber-reinforced thermoplastic polymer and comprising a shaft part that is integral with a first head part and extends in the axial direction, the fastening apparatus comprising:
   a fastening device configured to apply heat to the shaft body or to the shaft part in a non-contacting state while the shaft body or the shaft part is disposed within the through holes of the workpieces and then apply pressure while the shaft body or the shaft part remains disposed within the through holes of the workpieces to either: form the shaft body into a first head part, a shaft part formed integrally with the first head part and extending in the axial direction, and a second head part formed on an axial end of the shaft part that is opposite of the first head part, or form a second head part on the intermediate piece integrally with the shaft part and on an axial end of the shaft part that is opposite of the first head part, and thereby form the fastener that fastens the workpieces; and
   a central processing unit and memory configured to determine whether the fastener is defective or not defective;
   wherein:
   the fastening device comprises:
      a heater configured to heat the shaft body or the shaft part without the heater contacting the shaft body or the shaft part;
      a fastening die configured to form the fastener from the heated shaft body or the heated shaft part; and
      a press configured to apply the pressure to the fastening die; and
   the central processing unit and memory are configured to:
      calculate a load curve defined by the time and the load during which the pressure is applied,
      determine whether an amount of change per unit of time in the load curve after a reference load has been exceeded is within the range of a first reference value,
      calculate an adapted load curve by differentiating the load curve with respect to time, and
      determine whether the fastener is defective or not defective by using the adapted load curve together with the load curve.

15. The fastening apparatus according to claim 14, wherein the fiber-reinforced thermoplastic polymer is a carbon-fiber-reinforced thermoplastic polymer.

16. The fastening apparatus according to claim 14, wherein the heater comprises a high-frequency induction coil configured to inductively heat the shaft body or the shaft part by generating eddy currents in carbon fibers in the shaft part or shaft body.

17. The fastening apparatus according to claim 14, wherein the central processing unit and memory are configured to determine whether the amount that the load curve falls after a first peak, which appears after the application of the pressure, is within a range of a pre-determined second reference value.

18. The fastening apparatus according to claim 17, wherein the central processing unit and memory are configured to determine whether a peak-to-peak time between the first peak and a second peak in the load curve is within a range of a pre-determined third reference value.

19. A fastening apparatus for fastening a plurality of workpieces, each having a through hole formed therein, using a fastener formed from one of: a shaft body made of a fiber-reinforced thermoplastic polymer and extending in an axial direction or an intermediate piece made of the fiber-reinforced thermoplastic polymer and comprising a shaft part that is integral with a first head part and extends in the axial direction, the fastening apparatus comprising:
   a fastening device configured to apply heat to the shaft body or to the shaft part in a non-contacting state while the shaft body or the shaft part is disposed within the through holes of the workpieces and then apply pressure while the shaft body or the shaft part remains disposed within the through holes of the workpieces to either: form the shaft body into a first head part, a shaft part formed integrally with the first head part and extending in the axial direction, and a second head part formed on an axial end of the shaft part that is opposite of the first head part, or form a second head part on the intermediate piece integrally with the shaft part and on an axial end of the shaft part that is opposite of the first head part, and thereby form the fastener that fastens the workpieces; and
   a central processing unit and memory configured to determine whether the fastener is defective or not defective;
   wherein:
   the fastening device comprises:
      a heater configured to heat the shaft body or the shaft part without the heater contacting the shaft body or the shaft part;
      a fastening die configured to form the fastener from the heated shaft body or the heated shaft part; and
      a press configured to apply the pressure to the fastening die; and
   the central processing unit and memory are configured to:
      calculate a load curve defined by the time and the load during which the pressure is applied,
      determine whether an amount of change per unit of time in the load curve after a reference load has been exceeded is within the range of a first reference value,
      determine whether the amount that the load curve falls after a first peak, which appears after the application of the pressure, is within a range of a pre-determined second reference value, and
      determine whether a peak-to-peak time between the first peak and a second peak in the load curve is within a range of a pre-determined third reference value.

20. The fastening apparatus according to claim 19, wherein the fiber-reinforced thermoplastic polymer is a carbon-fiber-reinforced thermoplastic polymer.

21. The fastening apparatus according to claim 19, wherein the heater comprises a high-frequency induction coil configured to inductively heat the shaft body or the shaft part by generating eddy currents in carbon fibers in the shaft part or shaft body.

22. The fastening apparatus according to claim 21, wherein the central processing unit and memory are configured to:

calculate an adapted load curve by differentiating the load curve with respect to time, and determine whether the fastener is defective or not defective by using the adapted load curve together with the load curve.

23. The fastening apparatus according to claim 19, further comprising a recording device that records a determination result of the central processing unit.

24. A fastening apparatus for fastening a plurality of workpieces, each having a through hole formed therein, using a fastener formed from an intermediate piece made of a fiber-reinforced thermoplastic polymer and comprising a shaft part that is integral with a first head part and extends in an axial direction, the fastening apparatus comprising:

a fastening device configured to apply heat to the shaft part in a non-contacting state while the shaft part is disposed within the through holes of the workpieces and then apply pressure while the shaft part remains disposed within the through holes of the workpieces to form a second head part on the intermediate piece integrally with the shaft part and on an axial end of the shaft part that is opposite of the first head part, and thereby form the fastener that fastens the workpieces; and a central processing unit and memory configured to determine whether the fastener is defective or not defective;

wherein:

the fastening device comprises:

a heater configured to heat the shaft part without the heater contacting the shaft part;

a fastening die configured to form the second head part from the heated shaft part; and a press configured to apply the pressure to the fastening die; and the central processing unit and memory are configured to:

calculate a load curve defined by the time and the load during which the pressure is applied, determine whether an amount of change per unit of time in the load curve after a reference load has been exceeded is within a range of a pre-determined first reference value, calculate an adapted load curve by differentiating the load curve with respect to time, and determine whether the fastener is defective or not defective by using the adapted load curve together with the load curve.

25. The fastening apparatus according to claim 24, wherein the fiber-reinforced thermoplastic polymer is a carbon-fiber-reinforced thermoplastic polymer.

26. The fastening apparatus according to claim 24, wherein the heater comprises a high-frequency induction coil configured to inductively heat the shaft part by generating eddy currents in carbon fibers in the shaft part.

27. The fastening apparatus according to claim 24, wherein the central processing unit and memory are configured to determine whether the amount that the load curve falls after a first peak, which appears after the application of the pressure, is within a range of a pre-determined second reference value.

28. The fastening apparatus according to claim 27, wherein the central processing unit and memory are configured to determine whether a peak-to-peak time between the first peak and a second peak in the load curve is within a range of a pre-determined third reference value.

29. A fastening apparatus for fastening a plurality of workpieces, each having a through hole formed therein, using a fastener formed from an intermediate piece made of a fiber-reinforced thermoplastic polymer and comprising a shaft part that is integral with a first head part and extends in an axial direction, the fastening apparatus comprising:

a fastening device configured to heat the shaft part in a non-contacting state while the shaft part is disposed within the through holes of the workpieces and then apply pressure while the shaft part remains disposed within the through holes of the workpieces to form a second head part on the intermediate piece integrally with the shaft part and on an axial end of the shaft part that is opposite of the first head part, and thereby form the fastener that fastens the workpieces; and a central processing unit and memory configured to determine whether the fastener is defective or not defective;

wherein:

the fastening device comprises:

a heater configured to apply heat to the shaft part without the heater contacting the shaft part;

a fastening die configured to form the second head part from the heated shaft part; and a press configured to apply the pressure to the fastening die; and the central processing unit and memory are configured to:

calculate a load curve defined by the time and the load during which the pressure is applied, determine whether an amount of change per unit of time in the load curve after a reference load has been exceeded is within a range of a pre-determined first reference value, determine whether the amount that the load curve falls after a first peak, which appears after the application of the pressure, is within a range of a pre-determined second reference value, and determine whether a peak-to-peak time between the first peak and a second peak in the load curve is within a range of a pre-determined third reference value.

30. The fastening apparatus according to claim 29, wherein the fiber-reinforced thermoplastic polymer is a carbon-fiber-reinforced thermoplastic polymer.

31. The fastening apparatus according to claim 29, wherein the heater comprises a high-frequency induction coil configured to inductively heat the shaft part by generating eddy currents in carbon fibers in the shaft part.

32. The fastening apparatus according to claim 31, wherein the central processing unit and memory are configured to:

calculate an adapted load curve by differentiating the load curve with respect to time, and determine whether the fastener is defective or not defective by using the adapted load curve together with the load curve.

33. The fastening apparatus according to claim 29, further comprising a recording device that records a determination result of the central processing unit.

* * * * *